(12) United States Patent
Dwarakanath et al.

(10) Patent No.: US 9,460,078 B2
(45) Date of Patent: Oct. 4, 2016

(54) IDENTIFYING GLOSSARY TERMS FROM NATURAL LANGUAGE TEXT DOCUMENTS

(71) Applicant: Accenture Global Services Limited, Dublin (IE)

(72) Inventors: Anurag Dwarakanath, Bangalore (IN); Roshni R. Ramnani, Bangalore (IN); Shubhashis Sengupta, Bangalore (IN); Aniya Aggarwal, New Delhi (IN)

(73) Assignee: Accenture Global Services Limited, Dublin (IE)

( * ) Notice: Subject to any disclaimer, the term of this patent is extended or adjusted under 35 U.S.C. 154(b) by 227 days.

(21) Appl. No.: 14/092,518

(22) Filed: Nov. 27, 2013

(65) Prior Publication Data
US 2014/0163966 A1 Jun. 12, 2014

(30) Foreign Application Priority Data

Dec. 6, 2012 (IN) .......................... 5081/CHE/2012
Sep. 13, 2013 (IN) .......................... 4068/CHE/2013

(51) Int. Cl.
*G06F 17/27* (2006.01)
*G06F 17/20* (2006.01)
*G06F 17/28* (2006.01)

(52) U.S. Cl.
CPC ....... *G06F 17/2735* (2013.01); *G06F 17/2765* (2013.01)

(58) Field of Classification Search
CPC ..................... G06F 17/2785; G06F 17/30598; G06F 17/30705; G06F 17/30684; G06F 17/3089; G06F 17/30011; G06F 17/27; G06F 17/30; G06F 17/2705; G06F 17/2795; G06F 17/30731; G06F 17/30734; G06F 17/30737

USPC ....................................................... 704/1–10
See application file for complete search history.

(56) References Cited

U.S. PATENT DOCUMENTS 5,519,608 A * 5/1996 Kupiec ............... G06F 17/3064
704/9
5,619,410 A * 4/1997 Emori ................. G06F 17/2795
704/7

(Continued)

OTHER PUBLICATIONS

Karoui, L., Aufaure, M. A., & Bennacer, N. (Apr. 2007). Analyses and fundamental ideas for a relation extraction approach. In Data Engineering Workshop, 2007 IEEE 23rd International Conference on (pp. 880-887). IEEE.*

(Continued)

*Primary Examiner* — Michael Ortiz Sanchez
(74) *Attorney, Agent, or Firm* — Harrity & Harrity, LLP

(57) ABSTRACT

A device may obtain text to be analyzed to identify glossary terms. The device may analyze a linguistic unit to generate multiple linguistic units related to the linguistic unit. The device may analyze the multiple linguistic units to generate potential glossary terms. The device may perform a glossary term analysis on the potential glossary terms to generate glossary terms that include a subset of the potential glossary terms. The device may identify included terms that are included in the glossary terms. The device may identify excluded terms that are excluded from the glossary terms. The device may determine a semantic relatedness score between at least one excluded term and at least one included term. The device may selectively add the excluded linguistic term to the glossary terms to form a final set of glossary terms based on the semantic relatedness score, and may output the final set of glossary terms.

20 Claims, 17 Drawing Sheets

(56) References Cited

U.S. PATENT DOCUMENTS

| | | | | |
|---|---|---|---|---|
| 5,696,962 | A * | 12/1997 | Kupiec | G06F 17/30672 |
| 6,678,694 | B1 * | 1/2004 | Zimmermann | G06F 17/30705 707/731 |
| 2006/0100856 | A1 * | 5/2006 | Kang | G06F 17/2735 704/9 |
| 2008/0243488 | A1 * | 10/2008 | Balmelli | G06F 17/271 704/10 |
| 2008/0270120 | A1 * | 10/2008 | Pestian | G06F 17/2795 704/9 |
| 2009/0138793 | A1 * | 5/2009 | Verma | G06F 8/70 715/234 |
| 2009/0182549 | A1 * | 7/2009 | Anisimovich | G06F 17/2755 704/4 |
| 2010/0228693 | A1 * | 9/2010 | Dawson | G06F 17/2705 706/12 |
| 2012/0215523 | A1 * | 8/2012 | Inagaki | G06F 17/30705 704/9 |
| 2013/0138696 | A1 * | 5/2013 | Turdakov | G06F 17/30734 707/794 |
| 2014/0040275 | A1 * | 2/2014 | Dang | G06F 17/2785 707/741 |
| 2015/0227505 | A1 * | 8/2015 | Morimoto | G06F 17/2785 704/9 |

OTHER PUBLICATIONS

Neill et al., "Requirements engineering: the state of the practice", *Software*, IEEE, vol. 20 No. 6, Nov./Dec. 2003, 7 pages.
Mich et al., "Market research for requirements analysis using linguistic tools" *Requirements Engineering*, vol. 9 No. 1, 25 pages.
IEEE Computer Society, Software Engineering Standards Committee, Electronics Engineers, Inc., & IEEE-SA Standards Board, "IEEE recommended practice for software requirements specifications" vol. 830, No. 1998, Jun. 25, 1998, 37 pages.
Object Modeling Group, "Semantics of Business Vocabulary and Business Rules", www.omg.org/spec/SBVR/1.0/, Jan. 2008, 434 pages.
Berry et al., "From contract drafting to software specification: Linguistic sources of ambiguity", https://cs.uwaterloo.ca/~dberry/handbook/ambiguityHandbook.pdf, Nov. 2003, 80 pages.
Kageura et al., "Methods of automatic term recognition: A review", Terminology vol. 3 No. 2, May 27, 1996, 25 pages.
Park et al., "Automatic glossary extraction: beyond terminology identification", In Proceedings of the 19th international conference on Computational linguistics-vol. 1, Association for Computational Linguistics, Aug. 2002, pp. 1-7.
Gacitua et al., "Relevance-based abstraction identification: technique and evaluation", Requirements Engineering, vol. 16 No. 3, 2011, 15 pages.
Chen, "The entity-relationship model—toward a unified view of data", ACM Transactions on Database Systems, vol. 1 No. 1, Mar. 1976, pp. 9-36.
Miller, "WordNet: a lexical database for English", Communications of the ACM, vol. 38 No. 11, Nov. 1995, pp. 39-41.
Pedersen et al., "WordNet:: Similarity: measuring the relatedness of concepts" American Association for Artificial Intelligence (www.aaai.org), May 2004, 2pages.
Apache OpenNLP, "The Apache Software Foundation", http://opennip.apache.org/, 2010, 1 page.
Tjong Kim Sang et al., "Introduction to the CoNLL-2000 shared task: Chunking", In Proceedings of the 2nd workshop on Learning language in logic and the 4th conference on Computational natural language learning, vol. 7, Sep. 2000, pp. 127-132.
Didier Bourigault, "Surface grammatical analysis for the extraction of terminological noun phrases", In Proceedings of the 14th conference on Computational linguistics, vol. 3, Aug. 23-28, 1992, pp. 977-981.
Justeson et al., "Technical terminology: some linguistic properties and an algorithm for identification in text", Natural language engineering, vol. 1 No. 1, Mar. 1995, pp. 9-27.
Chantree et al., "Detecting dangerous coordination ambiguities using word distribution", Recent Advances in Natural Language Processing, Current Issues in Linguistic Theory, vol. 4, 2007, 13 pages.
Wikipedia, "Serial Comma", http://en.wikipedia.org/wiki/Serial_comma, Oct. 7, 2013, 9 pages.
Christine Rupp, "Linguistic Methods of Requirements-Engineering (NLP)", In Proceedings of the European Software Process Improvement Conference (EuroSPI), 2000, 11 pages.
Wikipedia, "Infinitive", http://en.wikipedia.org/wiki/Infinitive, Oct. 16, 2013, 7 pages.
Matsuo et al, "Keyword extraction from a single document using word co-occurrence statistical information", International Journal on Artificial Intelligence Tools, 2003, 13 pages.
Adwait Ratnaparkhi, "Statistical models for unsupervised prepositional phrase attachment", In Proceedings of the 36th Annual Meeting of the Association for Computational Linguistics and 17th International Conference on Computational Linguistics, vol. 2, Aug. 1998, pp. 1079-1085.
Miriam Goldberg, "An unsupervised model for statistically determining coordinate phrase attachment", In Proceedings of the 37th annual meeting of the Association for Computational Linguistics on Computational Linguistics, Jun. 1999, pp. 610-614.
Health Exchange, California Healthcare Eligibility Enrollment, and Retention System (CalHEERS), http://www.healthexchange.ca.gov/StakeHolders/Documents/CalHEERS%20Requirement%20Process%20and%20Requirements%20Document.pdf, 2012, 45 pages.
Aguilera et al., "The use of a repeated phrase finder in requirements extraction", Journal of Systems and Software, vol. 13 No. 3, 1990, pp. 209-230.
Geoffrey Leech, "100 million words of English", English Today, vol. 9 No. 1, Jan. 1993, pp. 9-15.
California Health Benefit Exchange, http://www.healthexchange.ca.gov/StakeHolders/Pages/2012StakeholderArchive.aspx, 2012, 5 pages.
British National Corpus, "The BNC in numbers", http://www.natcorp.ox.ac.uk/corpus/index.xm?ID=numbers, Jan. 2009, 1 page.
WordNet Princeton, "wnstats—WordNet 3.0 database statistics", http://wordnet.princeton/edu/wordnet/man/wnstats.7WN.html, May 28, 2005, 2 pages.
George A. Miller, " WordNet: a lexical database for English", Communications of the ACM, vol. 38, No. 11, Nov. 1995, pp. 39-41.
Schone et al., Is knowledge-free induction of multiword unit dictionary headwords a solved problem?, In Proc. of the 6th Conference on Empirical Methods in Natural Language Processing (EMNLP 2001), 2001, 9 pages.
Goldin et al. "AbstFinder, a prototype natural language text abstraction finder for use in requirements elicitation", Automated Software Engineering, vol. 4, 1997, 38 pages.
Zoqo Zhang, "Jatetoolkit", https://code.google.com/p/jatetoolkit/, Mar. 7, 2013, 2 pages.
Frantzi et al., "Automatic recognition of multi-word terms:. the C-value/NC-value method", International Journal on Digital Libraries, vol. 3 No. 2, 17 pages.
Rose et al., "Automatic keyword extraction from individual documents", Text Mining: Applications and Theory, 2010, pp. 3-20.
NetLingo, "The Internet Dictionary", www.netlingo.com, Oct. 29, 2013, 3 pages.
Hideki, "WS4J (WordNet Similarity for Java)", https://code.google.com/p/ws4j/, May 14, 2013, 3 pages.
Anurag Dwarakanth, "Profile", https://sites.google.com/site/anuragdwarakanath/, Sep. 5, 2013, 1 page.
Aneesha, "Rake", https://github.com/aneesha/RAKE, Jan. 3, 2013, 1 page.
Maarek et al., "The Use of Lexical Affinities in Requirements Extraction", ACM SIGSOFT Engineering Notes, vol. 14 No. 3, 1989, pp. 196-202.
Leonid Kof, "Natural Language Processing for Requirements Engineering: Applicability to Large Requirements Documents", Proceedings of the Workshops, 19th International Conference on Automated Software Engineering, Aug. 23, 2004, 11 pages.

(56) References Cited

OTHER PUBLICATIONS

Wermter et al., "You can't beat frequency (unless you use linguistic knowledge): a qualitative evaluation of association measures for collocation and term extraction", In Proceedings of the 21st International Conference on Computational Linguistics and the 44th annual meeting of the Association for Computational Linguistics, Association for Computational Linguistics, Jul. 2006, pp. 785-792.

Zhang et al., "A comparative evaluation of term recognition algorithms", In Proceedings of The sixth international conference on Language Resources and Evaluation, 2008, pp. 2108-2113.

* cited by examiner

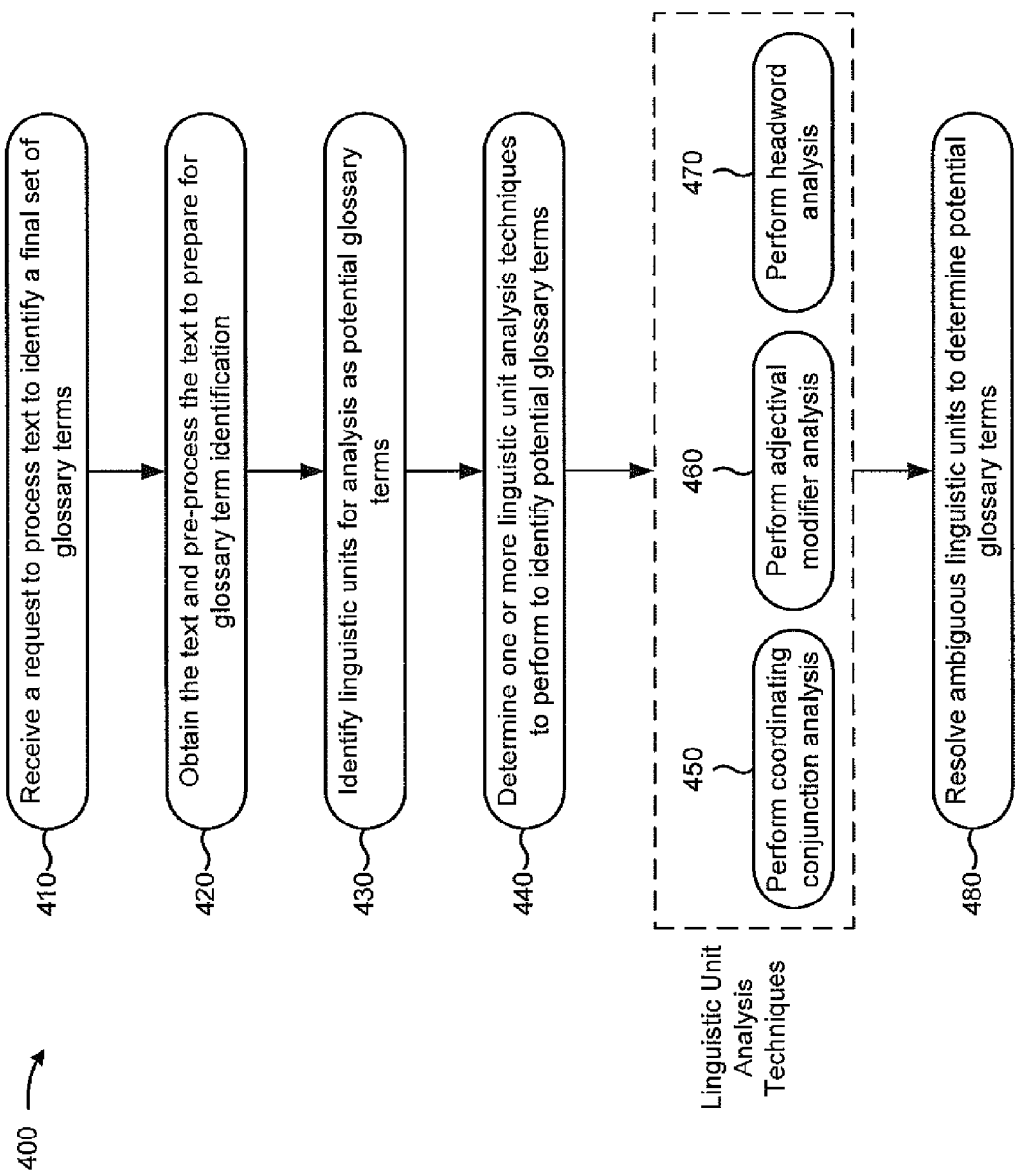

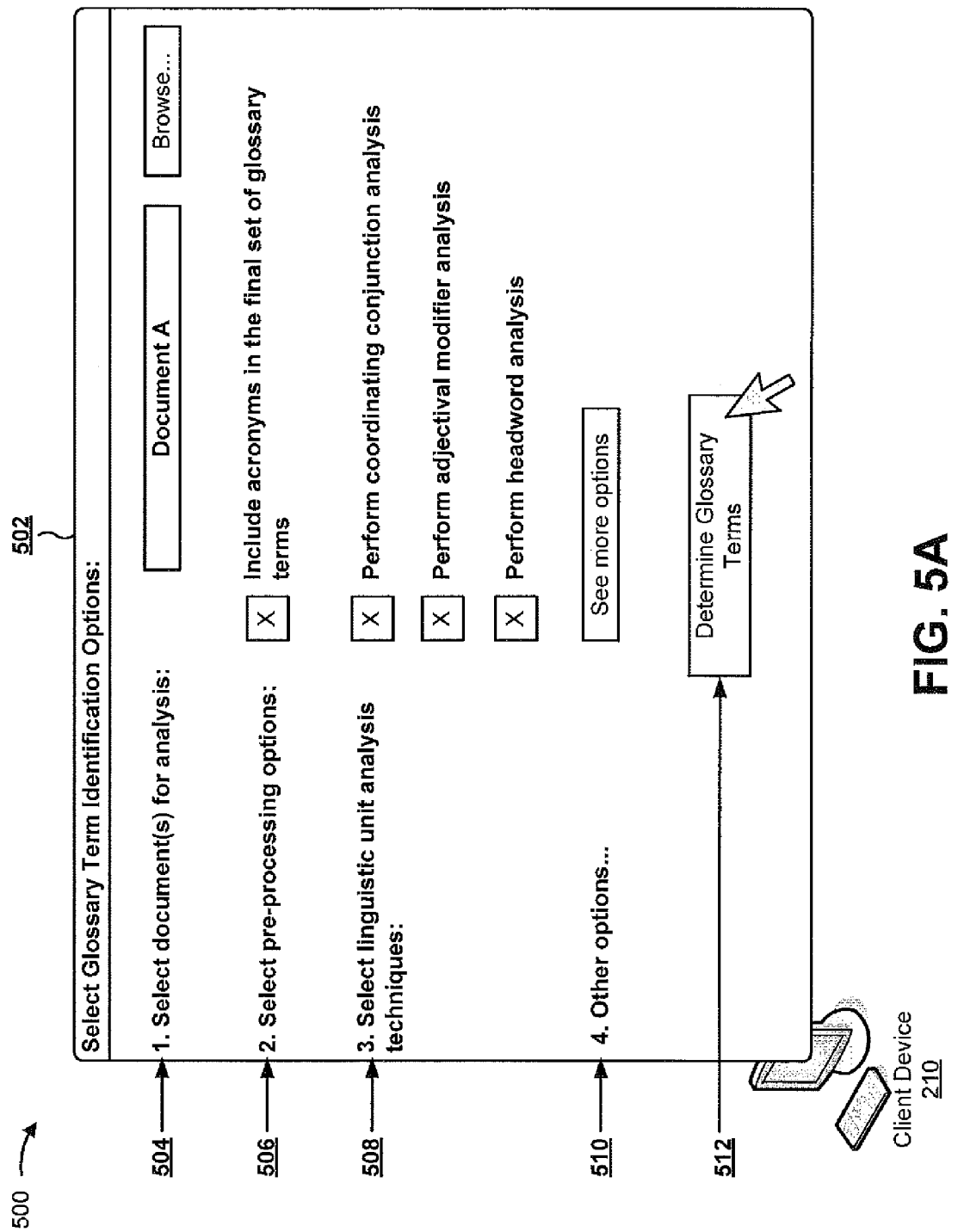

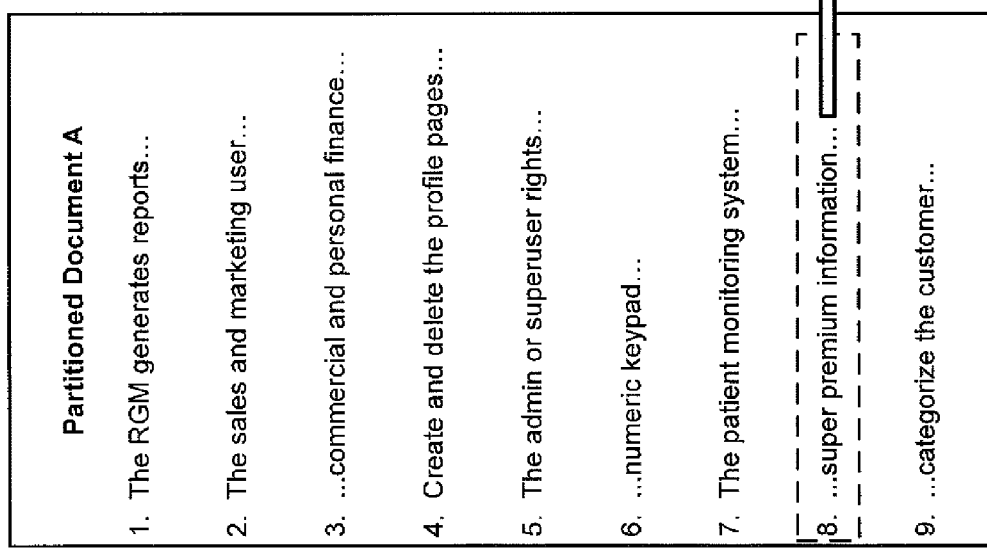
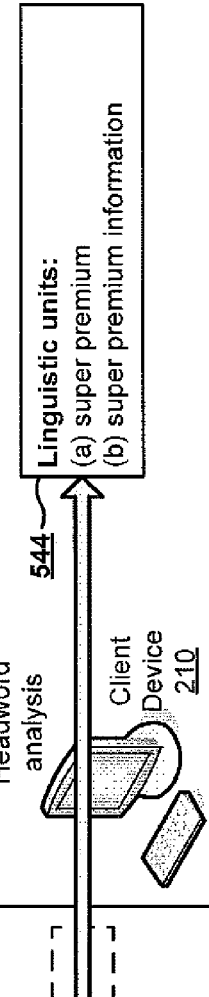
FIG. 5F

IDENTIFYING GLOSSARY TERMS FROM NATURAL LANGUAGE TEXT DOCUMENTS

BACKGROUND

A text document may include terms that may be interpreted differently by different readers, such as terms that have multiple meanings. Because of this, a reader may interpret a text document differently than the author of the document intended. This may be particularly troublesome in a system requirements document, where misinterpretation of a term may lead to an incorrect design of a system.

SUMMARY

According to some possible implementations, a device may include one or more processors to: obtain text of a document to be analyzed to identify glossary terms included in the text; perform a linguistic unit analysis on a linguistic unit, included in the text, to generate a plurality of ambiguous linguistic units from the linguistic unit; resolve the plurality of ambiguous linguistic units to generate a set of potential glossary terms that includes a subset of the plurality of ambiguous linguistic units; perform a glossary term analysis on the set of potential glossary terms to generate a set of glossary terms that includes a subset of the set of potential glossary terms; identify a set of included terms, of the set of potential glossary terms, that are included in the set of glossary terms; identify a set of excluded terms, of the set of potential glossary terms, that are excluded from the set of glossary terms; determine a semantic relatedness score between at least one excluded term, of the set of excluded terms, and at least one included term, of the set of included terms; selectively add the excluded linguistic term to the set of glossary terms to form a final set of glossary terms based on the semantic relatedness score; and output the final set of glossary terms for the document.

According to some possible implementations, a computer-readable medium may store one or more instructions that, when executed by one or more processors, cause the one or more processors to: obtain text to be analyzed to identify glossary terms included in the text; perform a linguistic unit analysis on a linguistic unit, included in the text, to generate a plurality of linguistic units related to the linguistic unit; analyze the plurality of linguistic units to generate a set of potential glossary terms that includes a subset of the plurality of linguistic units; perform a glossary term analysis on the set of potential glossary terms to generate a set of glossary terms that includes a subset of the set of potential glossary terms; identify a set of included terms, of the set of potential glossary terms, that are included in the set of glossary terms; identify a set of excluded terms, of the set of potential glossary terms, that are excluded from the set of glossary terms; determine a semantic relatedness score between at least one excluded term, of the set of excluded terms, and at least one included term, of the set of included terms; selectively add the excluded linguistic term to the set of glossary terms to form a final set of glossary terms based on the semantic relatedness score; and output the final set of glossary terms.

According to some possible implementations, a method may include: obtaining, by a device, text to be analyzed to identify glossary terms included in the text; performing, by the device, a linguistic unit analysis on a linguistic unit, included in the text, to generate a plurality of ambiguous linguistic units from the linguistic unit; analyzing, by the device, the plurality of ambiguous linguistic units to generate a set of potential glossary terms that includes a subset of the plurality of ambiguous linguistic units; performing, by the device, a glossary term analysis on the set of potential glossary terms to generate a set of glossary terms that includes a subset of the set of potential glossary terms; identifying, by the device, a set of included terms, of the set of potential glossary terms, that are included in the set of glossary terms; identifying, by the device, a set of excluded terms, of the set of potential glossary terms, that are excluded from the set of glossary terms; determining, by the device, a semantic relatedness score between an excluded term, of the set of excluded terms, and an included term, of the set of included terms; selectively adding, by the device, the excluded linguistic term to the set of glossary terms to form a final set of glossary terms based on the semantic relatedness score; and outputting, by the device, the final set of glossary terms.

BRIEF DESCRIPTION OF THE DRAWINGS

FIG. 4 is a flow chart of an example process for analyzing text to identify potential glossary terms;

FIGS. 5A-5H are diagrams of an example implementation relating to the example process shown in FIG. 4;

DETAILED DESCRIPTION

The following detailed description of example implementations refers to the accompanying drawings. The same reference numbers in different drawings may identify the same or similar elements.

A text document may include terms that may be interpreted differently by different readers, such as terms with multiple meanings, terms that mean different things in different contexts, etc. Because of this, a reader may interpret terms included in the text document differently than the author of the text document intended. When the text document includes instructions, such as design instructions, system requirements, etc., misinterpretation of a term may lead to an incorrect design of a system and/or other costly mistakes. Implementations described herein assist an author of a text document in clarifying the meaning of important terms included in the text document by identifying a set of glossary terms to be included in a glossary of the text document. The author may provide definitions for the set of glossary terms, thereby assisting the reader in understanding the author's intended meaning for the glossary terms.

Figure 1A:
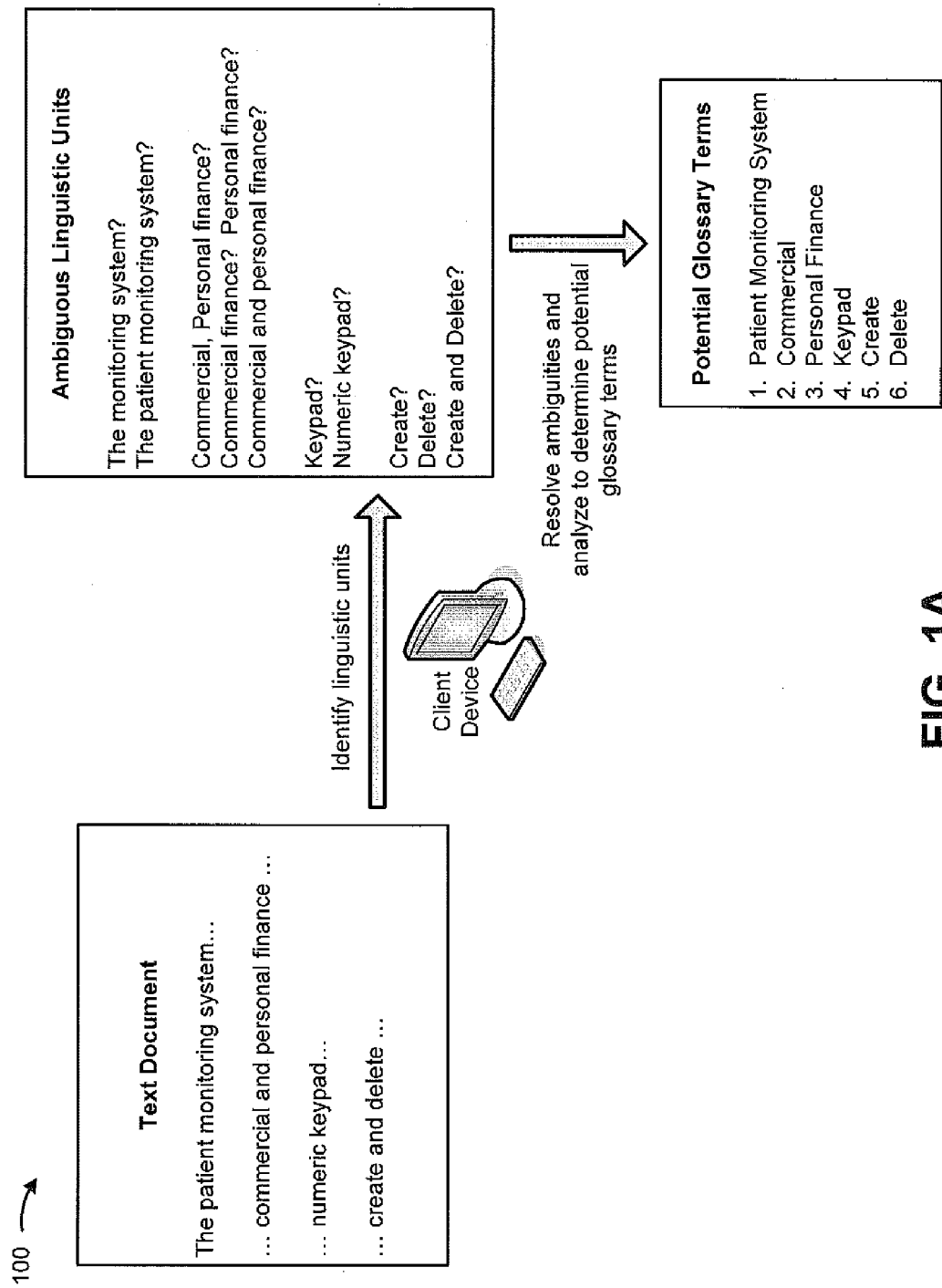
FIGS. 1A and 1B are diagrams of an overview of an example implementation described herein.
Figure 1B:
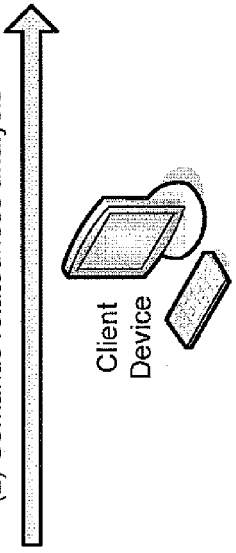

FIGS. 1A and 1B are diagrams of an overview of an example implementation 100 described herein. As shown in FIGS. 1A and 1B, a client device, such as a computer, may obtain a text document for processing, and may process the text document to identify a set of glossary terms. To do this, as shown in FIG. 1A, the client device may identify linguistic units included in the text document, such as words or phrases that act as a unit. When processing the text document, the client device may encounter ambiguous linguistic units that may have multiple meanings and/or that may be interpreted differently by different people. For example, the phrase "the patient monitoring system" may be interpreted as a system that monitors patients (e.g., people receiving medical treatment) or a monitoring system that has an attribute of patience (e.g., that is able to accept and tolerate delays). As further shown in FIG. 1A, the client device may analyze the linguistic units to resolve ambiguities, and may determine potential glossary terms based on the analysis.

As shown in FIG. 1B, the client device may determine a set of glossary terms by analyzing the potential glossary terms. The analysis of the potential glossary terms may include one or more glossary term analysis techniques, such as determining whether a potential glossary term occurs in the text document a threshold quantity of times, determining whether a potential glossary term relates to a physical entity, determining a polysemy count of a potential glossary term (e.g., a number of different senses or meanings associated with the term), etc.

Additionally, or alternatively, the analysis of the potential glossary terms may include a semantic relatedness analysis. For example, the client device may use a glossary term analysis technique to add potential glossary terms to a set of glossary terms. A potential glossary term that is initially excluded from the set of glossary terms based on applying the glossary term analysis technique may later be added to the set of glossary terms by determining a semantic relatedness of the excluded potential glossary term and terms included in the set of glossary terms. Based on performing the glossary term analysis techniques and the semantic relatedness analysis, the client device may determine a final set of glossary terms, and may output the final set of glossary terms (e.g., for display to a user). In this way, the client device may assist an author of a text document by processing the text document to identify a final set of glossary terms for the author to define.

Figure 2:
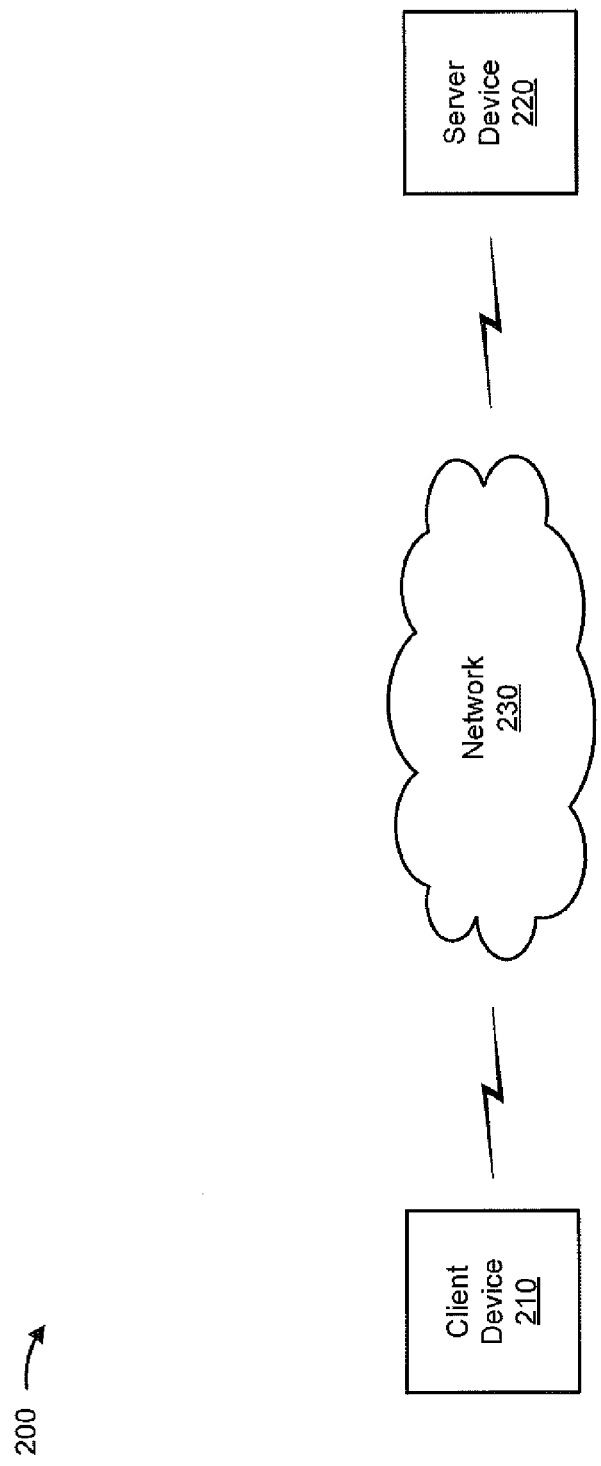
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a client device 210, a server device 220, and a network 230. Devices of environment 200 may interconnect via wired connections, wireless connections, or a combination of wired and wireless connections.

Client device 210 may include one or more devices capable of receiving, generating, storing, processing, and/or providing a text document and/or information associated with a text document (e.g., linguistic units, potential glossary terms, a set of glossary terms, a final set of glossary terms, etc.). For example, client device 210 may include a computing device, such as a desktop computer, a laptop computer, a tablet computer, a server, a mobile phone (e.g., a smart phone, a radiotelephone, etc.), or a similar device. In some implementations, client device 210 may process the text document to determine, store, and/or provide a final set of glossary terms based on the text document. In some implementations, client device 210 may receive information from and/or transmit information to server device 220 (e.g., a text document, information associated with the text document, information generated by processing the text document, a set of glossary terms, etc.).

Server device 220 may include one or more devices capable of receiving, generating, storing, processing, and/or providing a text document and/or information associated with a text document. For example, server device 220 may include a computing device, such as a server, a desktop computer, a laptop computer, a tablet computer, or a similar device.

Network 230 may include one or more wired and/or wireless networks. For example, network 230 may include a cellular network, a public land mobile network (PLMN), a local area network (LAN), a wide area network (WAN), a metropolitan area network (MAN), a telephone network (e.g., the Public Switched Telephone Network (PSTN)), an ad hoc network, an intranet, the Internet, a fiber optic-based network, and/or a combination of these or other types of networks.

The number of devices and networks shown in FIG. 2 is provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, one or more of the devices of environment 200 may perform one or more functions described as being performed by another one or more devices of environment 200.

Figure 3:
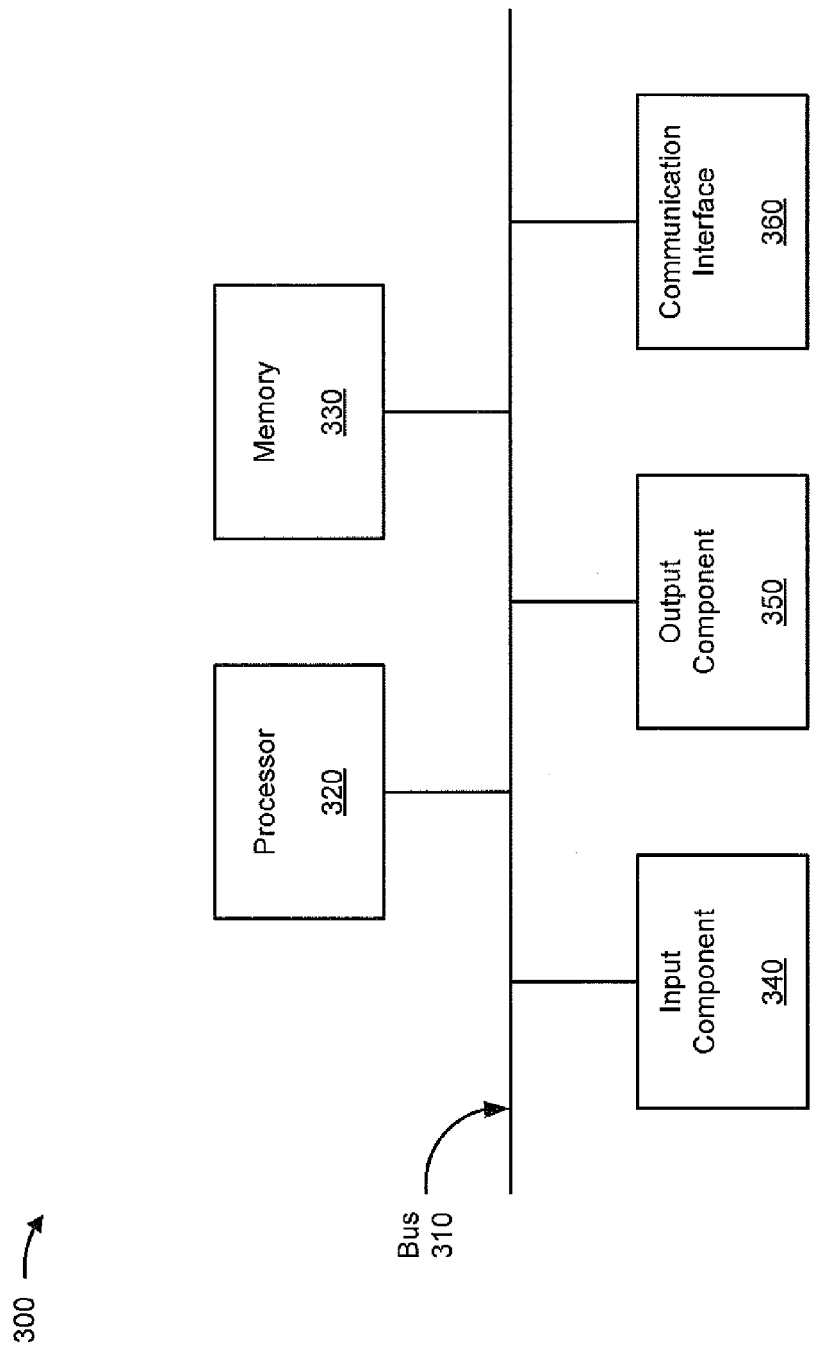
FIG. 3 is a diagram of example components of one or more devices of FIG. 2.

FIG. 3 is a diagram of example components of a device 300. Device 300 may correspond to client device 210 and/or server device 220. In some implementations, client device 210 and/or server device 220 may include one or more devices 300 and/or one or more components of device 300. As shown in FIG. 3, device 300 may include a bus 310, a processor 320, a memory 330, an input component 340, an output component 350, and a communication interface 360.

Bus 310 may include a component that permits communication among the components of device 300. Processor 320 may include a processor (e.g., a central processing unit, a graphics processing unit, an accelerated processing unit), a microprocessor, and/or any processing component (e.g., a field-programmable gate array (FPGA), an application-specific integrated circuit (ASIC), etc.) that interprets and/or executes instructions. Memory 330 may include a random access memory (RAM), a read only memory (ROM), and/or another type of dynamic or static storage device (e.g., a flash, magnetic, or optical memory) that stores information and/or instructions for use by processor 320.

Input component 340 may include a component that permits a user to input information to device 300 (e.g., a touch screen display, a keyboard, a keypad, a mouse, a button, a switch, etc.). Output component 350 may include a component that outputs information from device 300 (e.g., a display, a speaker, one or more light-emitting diodes (LEDs), etc.).

Communication interface 360 may include a transceiver-like component, such as a transceiver and/or a separate receiver and transmitter, that enables device 300 to communicate with other devices, such as via a wired connection, a wireless connection, or a combination of wired and wireless connections. For example, communication interface 360 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions included in a computer-readable medium, such as memory 330. A computer-readable medium is defined herein as a non-transitory memory device. A memory device may include memory space within a single physical storage device or memory space spread across multiple physical storage devices.

Software instructions may be read into memory 330 from another computer-readable medium or from another device via communication interface 360. When executed, software instructions stored in memory 330 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number of components shown in FIG. 3 is provided as an example. In practice, device 300 may include additional components, fewer components, different components, or differently arranged components than those shown in FIG. 3. Additionally, or alternatively, one or more components of device 300 may perform one or more functions described as being performed by another one or more components of device 300.

FIG. 4 is a flow chart of an example process 400 for analyzing text to identify potential glossary terms. In some implementations, one or more process blocks of FIG. 4 may be performed by client device 210. In some implementations, one or more process blocks of FIG. 4 may be performed by another device or a group of devices separate from or including client device 210, such as server device 220.

As shown in FIG. 4, process 400 may include receiving a request to process text to identify a final set of glossary terms (block 410). For example, client device 210 may receive a request (e.g., from a user and/or from another device) to process text to determine a final set of glossary terms. In some implementations, client device 210 may receive the request via user interaction with a user interface of client device 210. Additionally, or alternatively, client device 210 may provide a user interface via which a user may input the text, and client device 210 may obtain the input text via the user interface.

The text may include, for example, a document that includes text (e.g., a text file, a text document, a file that includes text and other information, such as images, etc.), a group of documents that include text (e.g., multiple files), a portion of a document that includes text (e.g., a portion indicated by a user, a portion identified by document metadata, etc.), and/or any information that includes text. In some implementations, the request may specify one or more sections of text to be processed. Additionally, or alternatively, the request may specify a manner in which the sections are to be partitioned for processing. For example, the sections may be sentences, and the request may specify that the sentences be partitioned based on capital letters and/or periods (.).

In some implementations, the request may identify one or more terms, included in the text, to be processed by client device 210 to determine whether the one or more terms are glossary terms. A term, as used herein, may refer to a particular combination of characters, such as a word, multiple words (e.g., a phrase, a sentence, a paragraph, etc.), a character, multiple characters (e.g., a character string), or the like.

The request may identify one or more linguistic unit analysis techniques and/or one or more glossary term analysis techniques to be used by client device 210 to determine the glossary terms, as described in more detail elsewhere herein.

As further shown in FIG. 4, process 400 may include obtaining the text and pre-processing the text to prepare for glossary term identification (block 420). For example, client device 210 may receive the request to process the text. The request may include information identifying the text (e.g., a name of a text document) and/or may include information identifying a memory location at which the text is stored. The memory location may be local to client device 210 or external to, and possibly remote from, client device 210. Client device 210 may, based on receiving the request, retrieve the text from the memory location. The text may include multiple files storing text, a single file storing text, a portion of a file storing text, multiple lines of text, a single line of text, a portion of a line of text, etc.

Client device 210 may pre-process the text by determining sections of the text to process. For example, the request may indicate a manner in which the text is to be partitioned into sections, and client device 210 may partition the text into sections based on the indication. A text section may include, for example, a sentence, a line, a paragraph, a page, a document, a requirement (e.g., identified by a label), etc. In some implementations, client device 210 may label each text section, and may use the labels when processing the text to determine glossary terms. Additionally, or alternatively, client device 210 may process each text section separately (e.g., serially or in parallel).

Client device 210 may pre-process the text by determining one or more acronyms included in the text, in some implementations. Client device 210 may determine acronyms by, for example, identifying terms in title case, terms in capital case, terms in quotes, terms that include a uniform resource locator (URL), etc. In some implementations, client device 210 may determine that particular combinations of characters are not acronyms (e.g., particular words, such as ONLY, ALWAYS, AND, etc.). Client device 210 may include determined acronyms in the set of glossary terms (and/or the final set of glossary terms), as described elsewhere herein.

Client device 210 may identify terms that will or will not be included in the set of glossary terms, in some implementations. For example, client device 210 may obtain a list of terms (e.g., from a dictionary, such as an information technology (IT) dictionary, a legal dictionary, etc.), and may add terms from the text, that are included in the list, to the set of glossary terms. Alternatively, client device 210 may exclude terms from the text, that are included in the list, from the set of glossary terms. Additionally, or alternatively, client device 210 may exclude the terms from further processing (e.g., by converting the terms to acronyms).

As further shown in FIG. 4, process 400 may include identifying linguistic units for analysis as potential glossary terms (block 430). For example, client device 210 may analyze the text to identify linguistic units. A linguistic unit may include a word or a group of words that work as a single unit of speech, text, or language. For example, consider the sentence: "The valid password should be accepted based on its strength." Here, the phrase "password should be" is not a linguistic unit, while "the valid password," "accepted," and "its strength" are all linguistic units.

Client device 210 may identify linguistic units by parsing the text sections to identify nouns, noun phrases, verbs, and/or verb phrases. For example, client device 210 may use a parser and/or a chunker (e.g., Apache openNLP's chunker) to identify nouns, noun phrases, verbs, and/or verb phrases in the text. Additionally, or alternatively, client device 210 may use a part-of-speech tagger to tag words in the text with a label that identifies a part-of-speech of the word. Client device 210 may use part-of-speech patterns to identify noun phrases and/or verb phrases. For example, a noun phrase may include one or more nouns (e.g., tree, baseball bat), one or more adjectives followed by one or more nouns (e.g., big tree, big fat tree, premium baseball bat, super premium baseball bat), one or more nouns followed by a conjunction followed by one or more nouns (e.g., fish and chips, baseball bat and baseball mitt), one or more adjectives followed by one or more nouns followed by a conjunction followed by one or more nouns (e.g., large fish and chips, large men's shirt and pants suit), one or more adjectives followed by a conjunction followed by one or more adjectives followed by one or more nouns (e.g., commercial and personal finance, green and smooth leaf), or the like.

In some implementations, client device 210 may use a sequence of characters that forms a search pattern (e.g., a regular expression, or regex) to search the text for patterns that match the sequence of characters. As an example, client device 210 may use the following regular expression:

$$((A^*N^+)|(A^*N^+CN^+)|A^+CA^+N^+)) \qquad \text{Noun phrases}$$

$$(V) \qquad \text{Verb phrases}$$

In the above regular expression, A represents an adjective, N represents a noun, C represents a conjunction, and V represents a verb. Furthermore, an asterisk (*) following a symbol represents that the symbol is optional (e.g., can occur 0 or more times) in the expression, a plus sign (+) following a symbol represents that there may be one or more of the type of word represented by the symbol, and | represents an "OR" operator. Thus, $A^*N^+$ means that a noun phrase may be identified by one or more optional adjectives followed by one or more nouns, or simply by one or more nouns (without the optional adjective). As shown in the regular expression, client device 210 may identify single word verbs as verb phrases. Client device 210 may identify the linguistic units as the noun phrases and verb phrases that match the above patterns in the regular expression. Client device 210 may exclude, from the analysis, prepositions, adverbs, and other parts-of-speech not identified in the regular expression.

As further shown in FIG. 4, process 400 may include determining one or more linguistic unit analysis techniques to perform to identify potential glossary terms (block 440). For example, client device 210 may determine the linguistic unit analysis technique(s) to perform, to determine potential glossary terms, based on user input. Additionally, or alternatively, client device 210 may determine default linguistic unit analysis technique(s) to perform. In some implementations, client device 210 may determine the linguistic unit analysis technique(s) to perform based on a characteristic of the text (e.g., a size of the text, contents included in the text, a type of document that includes the text, a file format of a file that includes the text, etc.).

The linguistic unit analysis technique(s) may include a coordinating conjunction analysis, an adjectival modifier analysis, a headword analysis, or the like. Except as otherwise noted below, client device 210 may perform a single linguistic unit analysis technique, or may perform any combination of multiple linguistic unit analysis techniques. When performing a combination of multiple linguistic unit analysis techniques, client device 210 may perform the multiple linguistic unit analysis techniques in any order, except as otherwise noted below.

As further shown in FIG. 4, process 400 may include performing a coordinating conjunction analysis (block 450). For example, client device 210 may perform a coordinating conjunction analysis to identify linguistic units by breaking a phrase into conjuncts. A conjunct may refer to a coordination structure that connects two terms, such as via the use of a coordinating conjunction (e.g., "and," "or," etc.).

As an example, a coordinating conjunction may occur between nouns, such as in the phrase: "sales and marketing user." Client device 210 may break the phrase into conjuncts before or after performing coordination. For example, when breaking the phrase into conjuncts before performing coordination, client device 210 creates the two linguistic units "sales" and "marketing user." As another example, when breaking the phrase into conjuncts after performing coordination, client device 210 creates the two linguistic units "sales user" and "marketing user" (e.g., which was already created in the previous example). Additionally, or alternatively, client device 210 may not break the phrase into conjuncts. In this case, client device 210 creates one linguistic unit, "sales and marketing user." Thus, client device 210 may create a total of four linguistic units by performing a coordinating conjunction analysis on the phrase "sales and marketing user." The four linguistic units are "sales," "marketing user," "sales user," and "sales and marketing user."

In some implementations, client device 210 may analyze usage of commas when performing coordinating conjunction analysis. For example, client device 210 may analyze the phrase "sales, and marketing user" to determine the two linguistic units "sales" and "marketing user" rather than the four linguistic units described above.

As another example, a coordinating conjunction may occur between adjectives, such as in the phrase: "commercial and personal finance." In this case, client device 210 may perform the coordinating conjunction analysis in the same manner as described above with respect to nouns. In other words, client device 210 may break the phrase into conjuncts before performing coordination, may break the phrase into conjuncts after performing coordination, and/or may not break the phrase into conjuncts. When breaking the phrase into conjuncts before performing coordination, client device 210 creates the two linguistic units "commercial" and "personal finance." When breaking the phrase into conjuncts after performing coordination, client device 210 creates the two linguistic units "commercial finance" and "personal finance." When not breaking the phrase into conjuncts, client device 210 creates one linguistic unit, "commercial and personal finance." Thus, client device 210 may create a total of four linguistic units by performing a coordinating conjunction analysis on the phrase "commercial and personal finance." The four linguistic units are "commercial," "personal finance," "commercial finance," and "commercial and personal finance."

As another example, a coordinating conjunction may occur between verbs, such as in the phrase: "create and delete the files." In this case, client device 210 may break the verbs at the conjunction. Thus, client device 210 may create two linguistic units by performing a coordinating conjunction analysis on the phrase "create and delete the files." The two linguistic units are "create" and "delete." While the above examples have been shown using the conjunction "and," client device 210 may perform the coordinating conjunction analysis in the same manner for other conjunctions, such as "or."

As further shown in FIG. 4, process 400 may include performing an adjectival modifier analysis (block 460). For example, client device 210 may perform an adjectival modifier analysis to identify linguistic units by breaking a noun phrase, that includes an adjective, into a first linguistic unit that includes the adjective and a second linguistic unit that does not include the adjective.

As an example, client device 210 may perform an adjectival modifier analysis on the noun phrase: "numeric keypad." Client device 210 may create a first linguistic unit that includes the adjective: "numeric keypad" (e.g., the complete noun phrase). Client device 210 may create a second linguistic unit that does not include the adjective: "keypad."

As another example, consider the phrase "patient monitoring system." Here, the word "patient" may be a noun, in which case client device 210 creates one linguistic unit: "patient monitoring system." Alternatively, the word "patient" may be an adjective, in which case client device 210 creates two linguistic units: "monitoring system" and "patient monitoring system." In this case, client device 210 may treat "patient" as an adjective to increase the quantity of created linguistic units. Client device 210 may resolve ambiguous linguistic units (e.g., "monitoring system" vs. "patient monitoring system"), as described in more detail elsewhere herein.

As further shown in FIG. 4, process 400 may include performing a headword analysis (block 470). For example, client device 210 may perform a headword analysis to identify linguistic units by breaking a noun phrase into a first linguistic unit that includes the headword and a second linguistic unit that does not include the headword. A headword may include a noun that ends a noun phrase. In some implementations, a headword may include an abstract noun.

As an example, consider the phrase "premium information," which includes the adjective "premium" and the abstract noun headword "information." Client device 210 may create a first linguistic unit that includes the headword: "premium information" (e.g., the complete noun phrase). Client device 210 may create a second linguistic unit that does not include the headword: "premium."

In some implementations, a phrase may include more than one of a coordinating conjunction, an adjectival modifier, or a headword. In this case, client device 210 may determine an order in which to perform the analyses. For example, where a phrase includes all three types of ambiguities, client device 210 may first perform a coordinating conjunction analysis to create multiple linguistic units, may then split the resulting linguistic units into multiple linguistic units using a headword analysis, and may finally split the resulting linguistic units into multiple linguistic units using an adjectival modifier analysis. This is merely one example, and client device 210 may perform the analyses in a different order, in some implementations.

As further shown in FIG. 4, process 400 may include resolving ambiguous linguistic units to determine potential glossary terms (block 480). For example, client device 210 may generate multiple ambiguous linguistic units from a single noun phrase or verb phrase, as described above. In some implementations, client device 210 may determine a subset of the linguistic units, created from a single phrase, that are potential glossary terms.

When client device 210 creates multiple ambiguous linguistic units from a single phrase (e.g., a noun phrase or a verb phrase), client device 210 may resolve between the multiple ambiguous linguistic units based on a quantity of occurrences of each linguistic unit throughout the text. Client device 210 may determine that a linguistic unit that occurs with the highest frequency, as compared to other linguistic units of the multiple ambiguous linguistic units, is to be included in the set of potential glossary terms.

In some implementations, client device 210 may determine which technique used to break a phrase into linguistic units yielded the correct linguistic units. Client device 210 may make this determination based on a quantity of occurrences of a linguistic unit in the text. For example, the phrase "sales and marketing user" may be broken into the following linguistic units using three different techniques, as described above in connection with block 450:

Technique 1: (a) "sales" (b) "marketing user"
Technique 2: (c) "sales user" (d) "marketing user" (same as (b))
Technique 3: (e) "sales and marketing user"

If the term "sales" appears more frequently in the text than the terms "marketing user," "sales user," and "sales and marketing user," then client device 210 may determine that the two terms "sales" and "marketing user" are potential glossary terms. Similarly, if the term "sales user" appears most often, then client device 210 may include "sales user" and "marketing user" as potential glossary terms. If the term "sales and marketing user" appears most often, then client devices may include this single term "sales and marketing user" as a potential glossary term. If the term "marketing user" appears most often in the text, then client device 210 may determine whether "sales" or "sales user" occurs more often, and may include the term that occurs more often as a potential glossary term along with the term "marketing user." The above options may be mutually exclusive (e.g., if client device 210 includes "sales and marketing user" as a potential glossary term, then client device 210 cannot include any of the other linguistic units as potential glossary terms).

Client device 210 may apply a default rule to determine which linguistic unit(s) to include as potential glossary terms, in some implementations. For example, client device 210 may apply a default rule when there is a tie between the frequency of occurrence between two linguistic terms (e.g., each term appears the same number of times, and appears more often than other terms). Client device 210 may associate a different default rule with each linguistic unit analysis technique.

As an example, when there is a tie between linguistic units generated by performing a coordinating conjunction analysis, client device 210 may apply a default rule of selecting the linguistic units formed by breaking the phrase into conjuncts before performing coordination (e.g., to create the two linguistic units "sales" and "marketing user" from the example phrase "sales and marketing user"). As another example, when there is a tie between linguistic units generated by performing a headword analysis, client device 210 may apply a default rule of selecting a linguistic unit formed by excluding the headword (e.g., "premium" from the example phrase "premium information").

As another example, when there is a tie between linguistic units generated by performing an adjectival modifier analysis, client device 210 may apply a default rule of searching a list of adjectives (e.g., a stop list). If the adjective is included in the stop list, then client device 210 may select the linguistic unit without the adjective (e.g., "keypad" from the phrase "numeric keypad" when "numeric" is in the stop list). If the adjective is not included in the stop list, then client device 210 may select the linguistic unit with the adjective (e.g., "numeric keypad" when "numeric" is not in the stop list).

In some implementations, client device 210 may only create a single linguistic unit from a phrase. In this case, the single linguistic unit may be an unambiguous linguistic unit, and may be included in the set of potential glossary terms without the need to resolve an ambiguity. Additionally, or alternatively, client device 210 may include the unambiguous linguistic unit as a potential glossary term if the number of occurrences of the unambiguous linguistic unit satisfies a threshold.

Client device 210 may create a data structure that stores the linguistic units to assist in resolving ambiguous linguistic units, in some implementations. For example, client device 210 may create objects U that correspond to each noun phrase or verb in the text (e.g., $U_1$ through $U_i$, where i represents the number of noun phrases and verb phrases that are analyzed in the text). A noun phrase or verb phrase that generates multiple mutually exclusive linguistic units may include multiple rows (e.g., $u_1$, $u_2$, etc.), while a noun phrase or verb phrase that generates one or more unambiguous linguistic units may include a single row. As an example, client device 210 may create the following table for the phrase "sales and marketing user":

$$U = \begin{cases} u_{11} = \text{sales}, u_{12} = \text{marketing user} \\ u_{21} = \text{sales user}, u_{22} = \text{marketing user} \\ u_{31} = \text{sales and marketing user} \end{cases}$$

In the above expression, U represents the noun phrase "sales and marketing user." The first row (e.g., $u_{11}$ and $u_{12}$) represents the case where client device 210 breaks the phrase into conjuncts before or after performing coordination, resulting in the two linguistic units "sales" and "marketing user." The second row (e.g., $u_{21}$ and $u_{22}$) represents the case where client device 210 breaks the phrase into conjuncts after performing coordination, resulting in the two linguistic units "sales user" and "marketing user." The third row (e.g., $u_{31}$) represents the case where client device 210 does not break the phrase into conjuncts, resulting in one linguistic unit, "sales and marketing user." Each of these cases is mutually exclusive.

The above expression can be expressed more generically as:

$$U = \begin{cases} u_{11}, u_{12}, u_{13} \ldots u_{1m} \\ u_{21}, u_{22}, u_{23} \ldots u_{2m} \\ \vdots \\ u_{k1}, u_{k2}, u_{k3} \ldots u_{km}. \end{cases}$$

Client device 210 may use the objects U to resolve ambiguities between multiple cases and/or linguistic units. For example, client device 210 may use the following expression to resolve between ambiguous linguistic units:

$$\text{Unit}(U) = \begin{cases} \text{option } U_i \text{ if } \left[\text{argmax}_{i=1 \text{ to } k} \sum_{n=1}^{n=m} f(u_{in})\right] \geq \dfrac{\sum\limits_{\forall i} f(T_i)}{i} \\ \text{else choose the default option} \end{cases}$$

In the above expression, client device 210 determines the frequency of occurrence f of each ambiguous linguistic unit $u_{in}$ (where i represents a row in the table, and n represents a column in the table). Client device 210 may then determine the linguistic unit $u_{in}$ in U that occurs the most (e.g., has the maximum number of occurrences when compared to other linguistic units in U). Client device 210 may resolve U by selecting the linguistic unit in U that occurs the most as potential glossary term(s). If there is a tie in the quantity of occurrences, then client device 210 may select a default option for U by applying a default rule, as described elsewhere herein.

In some implementations, client device 210 may compare the quantity of occurrences of the linguistic unit that occurs the most to an average occurrence frequency of other linguistic units (e.g., that have already been resolved, that are unambiguous, etc.). For example, the value $T_i$ may denote the $i^{th}$ object, where the object has already been resolved (e.g., where an ambiguity for object $T_i$ has been resolved). Client device 210 may compare the frequency of occurrence of linguistic units in $U_i$ to an average quantity and/or frequency of occurrences of each resolved ambiguous linguistic unit $T_i$. If the frequency of occurrence of one or more linguistic unit(s) in $U_i$ satisfies a threshold based on an average quantity of occurrences of resolved terms (e.g., is greater than the threshold, is greater than or equal to the threshold, etc.), then client device 210 may select the linguistic units in $U_i$ as potential glossary term(s). If the frequency of occurrence of one or more linguistic unit(s) in $U_i$ does not satisfy the threshold, then client device 210 may select a default option for U by applying a default rule, as described elsewhere herein.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

FIGS. 5A-5H are diagrams of an example implementation 500 relating to example process 400 shown in FIG. 4. FIGS. 5A-5H depict examples where client device 210 obtains text and determines potential glossary terms by analyzing the text.

As shown in FIG. 5A, client device 210 may provide a user interface 502 for a user to input options associated with processing the text to determine potential glossary terms. As shown by reference number 504, the user may select one or more documents on which to perform the analysis. For example, the user may type a name of the document(s) and/or may browse a list of files and select the document(s) from the list of files (e.g., by interacting with a "Browse . . . " button). Assume that the user has identified a document, shown as "Document A." As shown by reference number 506, the user may select pre-processing options, such as whether to include acronyms in the set of glossary terms (and/or the final set of glossary terms). Assume that the user has selected to include acronyms in the final set of glossary terms.

As shown by reference number 508, the user may select one or more linguistic analysis techniques to be performed on the text by client device 210. Assume that the user has selected to perform a coordinating conjunction analysis, an adjectival modifier analysis, and a headword analysis, as shown. As shown by reference number 510, the user may select other options, such as one or more glossary term analysis options to be performed (e.g., described in more detail herein in connection with FIG. 6), a type of semantic relatedness analysis to perform, one or more threshold values to be used when performing an analysis (e.g., relating to one or more thresholds described elsewhere herein), etc. As shown by reference number 512, assume that the user interacts with an input mechanism to trigger client device 210 to perform the analysis.

Figure 5B:
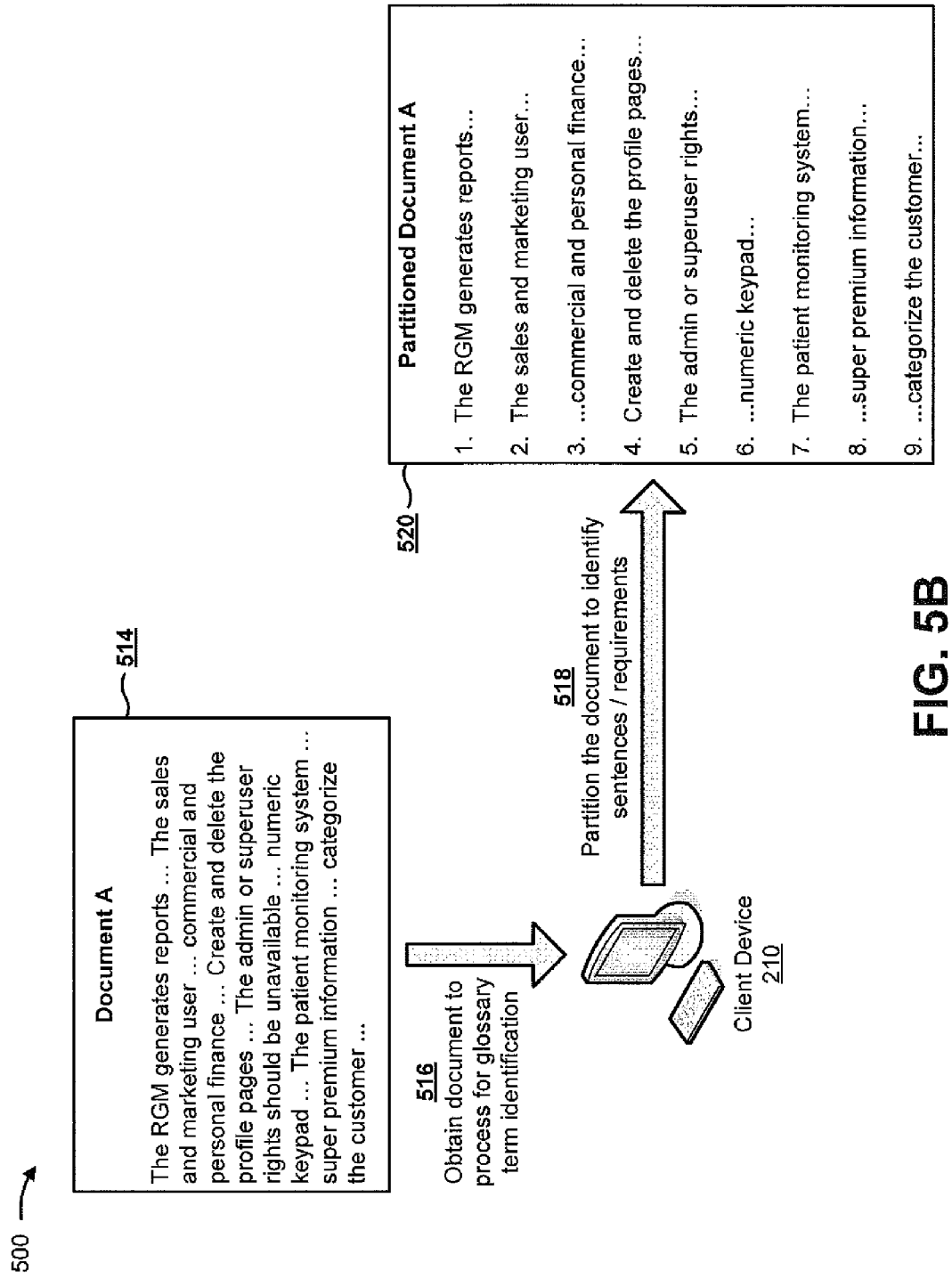

As shown in FIG. 5B, and by reference number 514, assume that Document A includes text relating to various requirements for a system to be designed. Further, assume that Document A is written using natural language text, and includes various phrases, such as "the sales and marketing user," "commercial and personal finance," etc., as shown. As shown by reference number 516, client device 210 obtains Document A based on the user interaction with the input mechanism. As shown by reference number 518, client device 210 partitions Document A into individual sentences or requirements to be parsed to identify glossary terms. As shown by reference number 520, assume that the partitioned document includes the nine phrases as part of sentences, as shown.

Figure 5C:
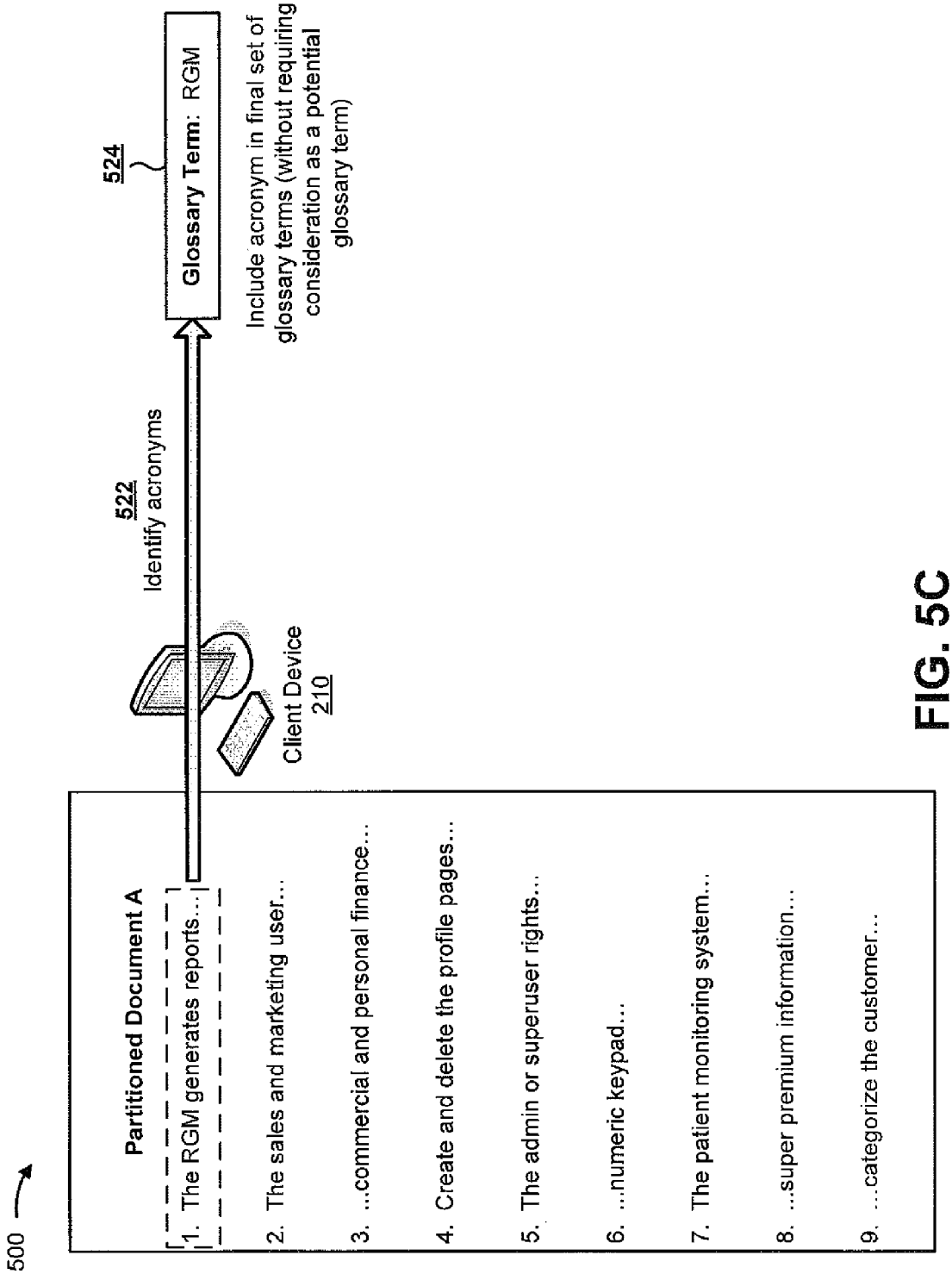

As shown in FIG. 5C, and by reference number 522, client device 210 may parse the partitioned document to identify acronyms. As shown by reference number 524, client device 210 may include identified acronyms in the final set of glossary terms (e.g., may automatically include the acronym as a glossary term, without requiring further consideration as a potential glossary term).

Figure 5D:
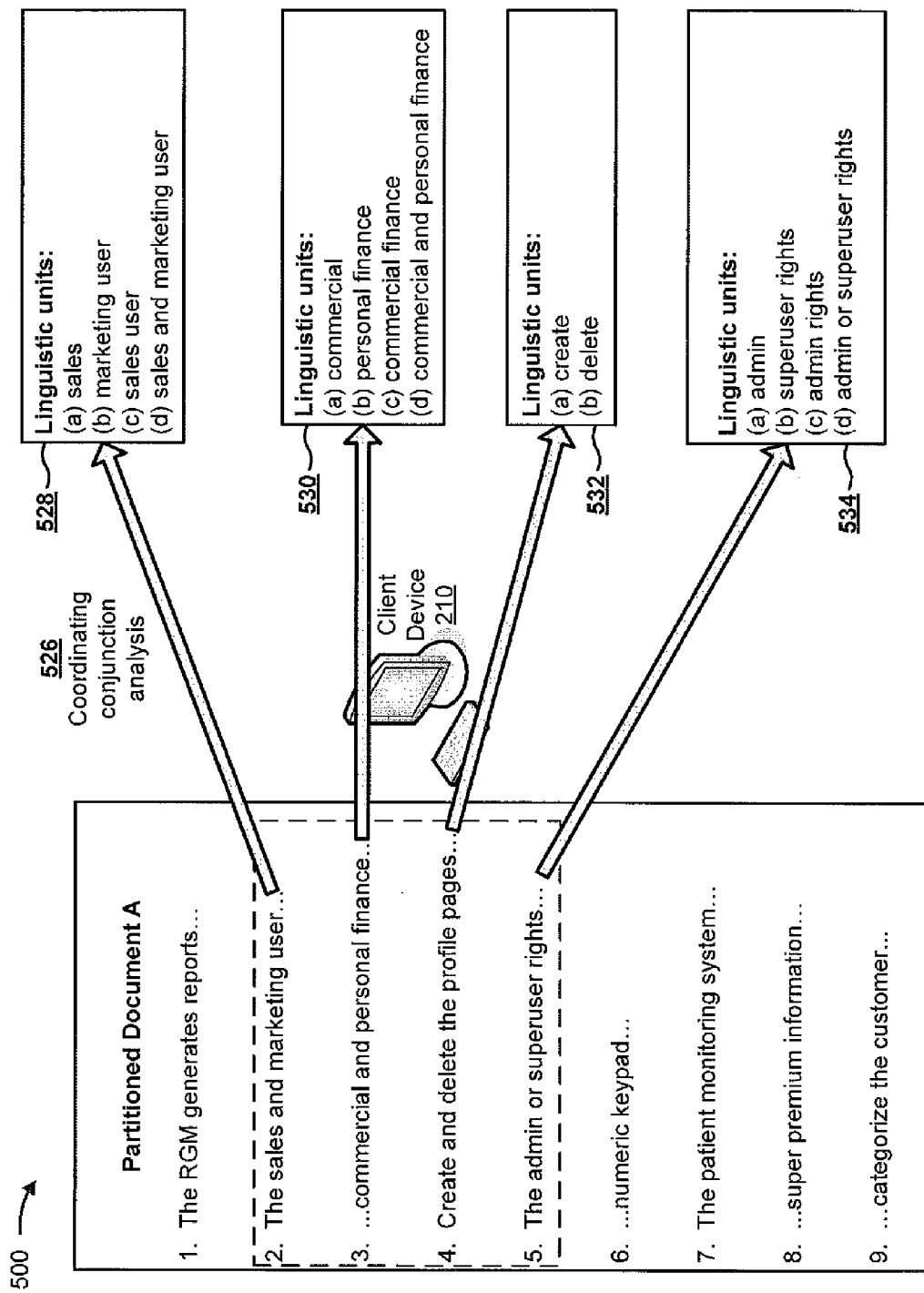

As shown in FIG. 5D, and by reference number 526, client device 210 may parse the partitioned document to identify noun phrases or verb phrases that include a coordinating conjunction, and may perform a coordinating conjunction analysis on those noun phrases and verb phrases. As shown by reference number 528, assume that client device 210 performs a coordinating conjunction analysis on the noun phrase "the sales and marketing user" to generate four linguistic units: (a) sales, (b) marketing user, (c) sales user, and (d) sales and marketing user. As shown by reference number 530, assume that client device 210 performs a coordinating conjunction analysis on the noun phrase "commercial and personal finance" to generate four linguistic units: (a) commercial, (b) personal finance, (c) commercial finance, and (d) commercial and personal finance. As shown by reference number 532, assume that client device 210 performs a coordinating conjunction analysis on the verb phrase "create and delete the profile pages" to generate two linguistic units: (a) create, and (b) delete. As shown by reference number 534, assume that client device 210 performs a coordinating conjunction analysis on the noun phrase "the admin or superuser rights" to generate four linguistic units: (a) admin, (b) superuser rights, (c) admin rights, and (d) admin or superuser rights.

Figure 5E:
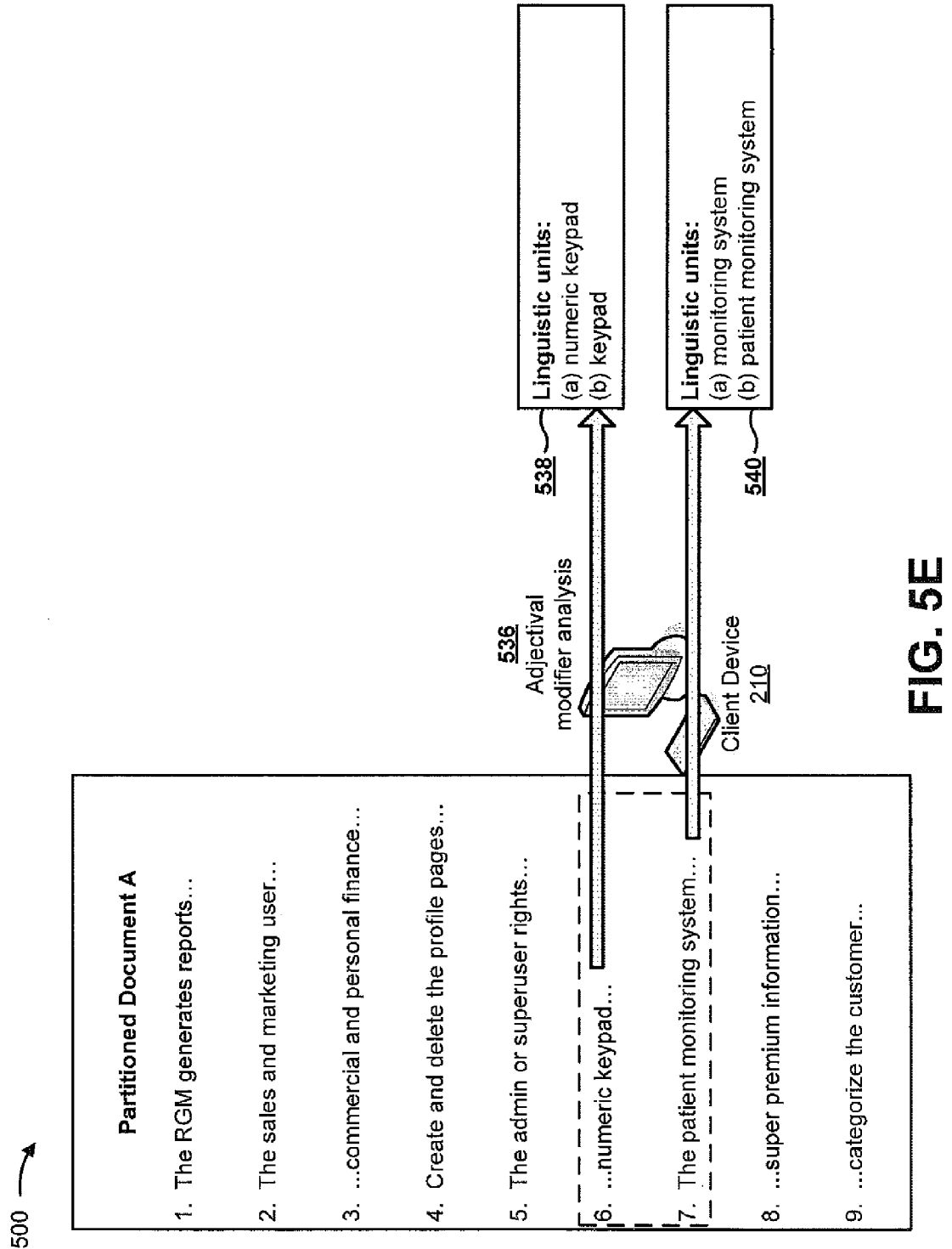

As shown in FIG. 5E, and by reference number 536, client device 210 may parse the partitioned document to identify noun phrases that include an adjective, and may perform an adjectival modifier analysis on those noun phrases. As shown by reference number 538, assume that client device 210 performs an adjectival modifier analysis on the noun phrase "numeric keypad" to generate two linguistic units: (a) numeric keypad, and (b) keypad. As shown by reference number 540, assume that client device 210 performs an adjectival modifier analysis on the noun phrase "the patient monitoring system" to generate two linguistic units: (a) monitoring system, and (b) patient monitoring system.

As shown in FIG. 5F, and by reference number 542, client device 210 may parse the partitioned document to identify noun phrases that include a headword, and may perform a headword analysis on those noun phrases. As shown by reference number 544, assume that client device 210 performs a headword analysis on the noun phrase "super premium information" to generate two linguistic units: (a) super premium, and (b) super premium information.

Figure 5G:
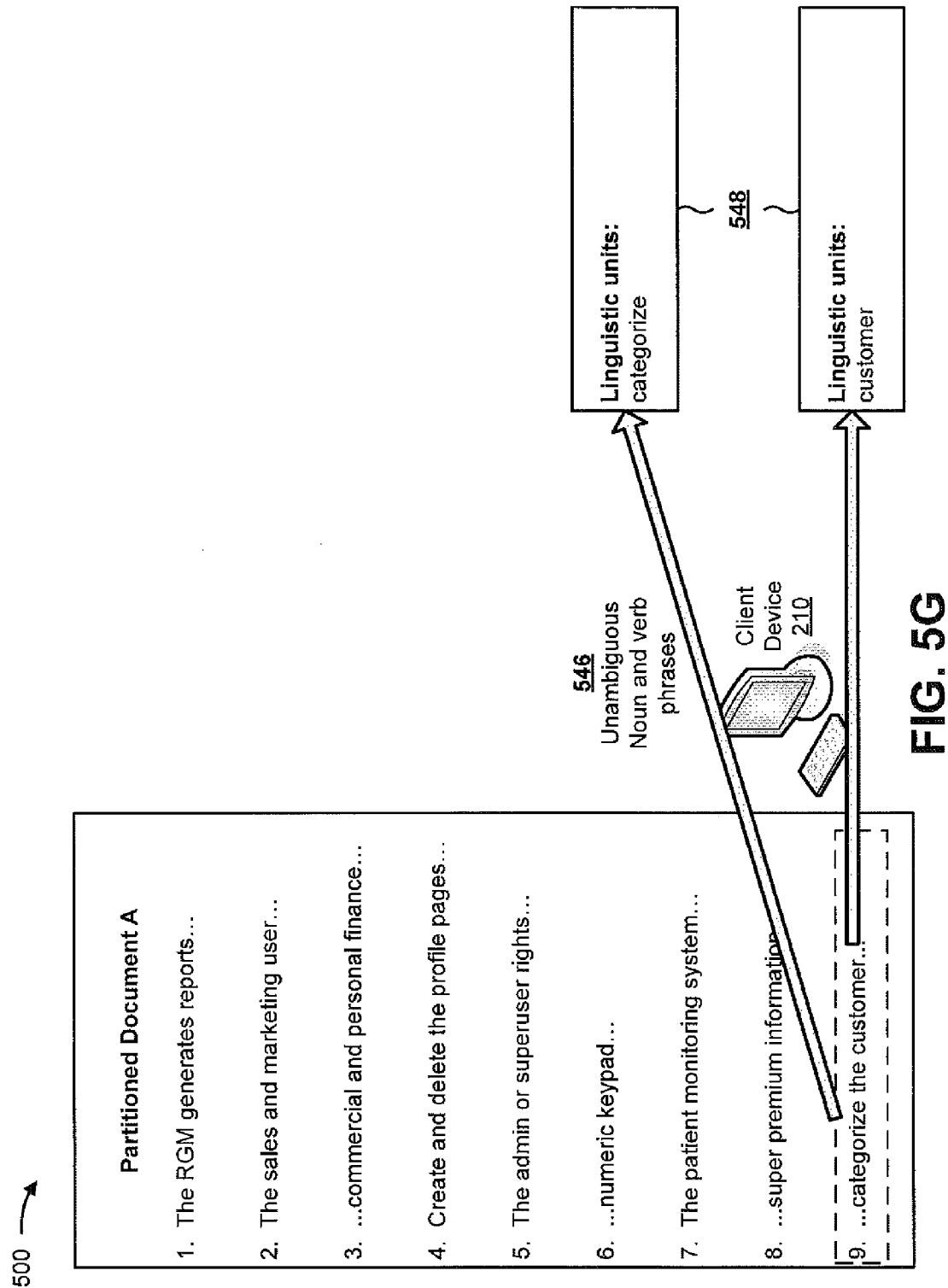

As shown in FIG. 5G, and by reference number 546, client device 210 may parse the partitioned document to identify noun phrases and verb phrases that are unambiguous (e.g., do not include a coordinating conjunction, an adjectival modifier, a headword, etc.). As shown by reference number 548, assume that client device 210 determines the verb phrase "categorize" and the noun phrase "customer" are linguistic units.

Figure 5H:
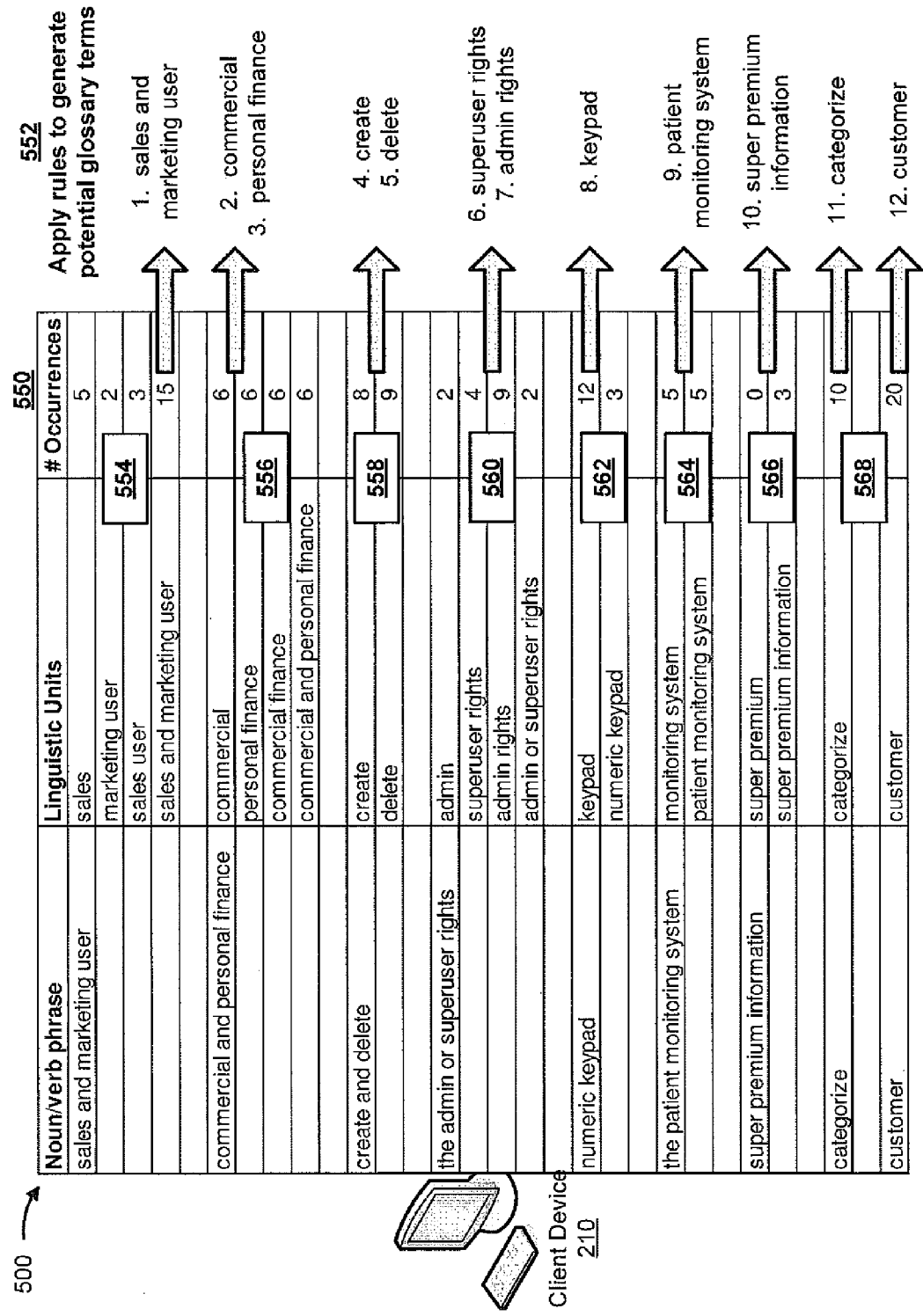

As shown in FIG. 5H, and by reference number 550, assume that client device 210 determines a quantity of occurrences (e.g., a frequency count) for each linguistic unit generated as described herein in connection with FIGS. 5D-5G. For example, assume that client device 210 parses Document A, and counts the number of occurrences of each linguistic unit. As shown by reference number 554, client device 210 determines that for the phrase "sales and marketing user," the linguistic unit "sales and marketing user" occurred more often in the document (15 times) than the other ambiguous linguistic units of "sales" (5 times), "marketing user" (2 times), and "sales user" (3 times). Thus, client device 210 identifies the linguistic unit "sales and marketing user" as a potential glossary term.

As shown by reference number 556, client device 210 determines that for the phrase "commercial and personal finance," the linguistic units "commercial," "personal finance," "commercial finance," and "commercial and personal finance" all occurred the same quantity of times in Document A (6 times). Thus, client device 210 refers to the default rule for coordinating conjunctions, and identifies the two linguistic units of "commercial" and "personal finance" as potential glossary terms.

As shown by reference number 558, client device 210 may determine that there is no ambiguity between the linguistic units "create" and "delete," generated from the phrase "create and delete the profile pages." Furthermore, client device 210 may determine that both linguistic units occur more than a threshold number of times (e.g., more than 3 times, as an example). Thus, client device 210 may identify both linguistic units as potential glossary terms.

As shown by reference number 560, client device 210 determines that for the phrase "the admin or superuser rights," the linguistic unit "admin rights" occurred more often in the document (9 times) than the other ambiguous linguistic units of "admin" (2 times), "superuser rights" (4 times), and "admin or superuser rights" (2 times). Thus, client device 210 identifies the linguistic units "superuser rights" and "admin rights" as potential glossary terms, based on determining that the appropriate technique for breaking the phrase into linguistic units is to break the phrase into conjuncts after performing coordination.

As shown by reference number 562, client device 210 determines that for the phrase "numeric keypad," the linguistic unit "keypad" occurred more often in the document (12 times) than the other ambiguous linguistic unit of "numeric keypad" (3 times). Thus, client device 210 identifies the linguistic unit "keypad" as a potential glossary term.

As shown by reference number 564, client device 210 determines that for the phrase "the patient monitoring system," the linguistic units "monitoring system" and "patient monitoring system" both occurred the same quantity of times in Document A (5 times). Thus, client device 210 refers to the default rule for adjectival modifiers, and identifies the linguistic unit of "patient monitoring system" as a potential glossary term, assuming that "patient" does not occur in an adjectival stop list, as described elsewhere herein.

As shown by reference number 566, client device 210 determines that for the phrase "super premium information," the linguistic unit "super premium information" occurred more often in the document (3 times) than the other ambiguous linguistic unit of "super premium" (0 times). Thus, client device 210 identifies the linguistic unit "super premium information" as a potential glossary term.

As shown by reference number 568, client device 210 determines that the unambiguous linguistic units of "categorize" and "customer" occur more than a threshold quantity of times (e.g., the frequency of occurrence of these linguistic units satisfies a threshold). Thus, client device 210 identifies the linguistic units "categorize" and "customer" as potential glossary terms.

To summarize, client device 210 has analyzed Document A by performing pre-processing, acronym identification, a coordinating conjunction analysis, an adjectival modifier analysis, and a headword analysis. Client device 210 has then resolved ambiguous linguistic units generated as a result of these analyses. By resolving the ambiguous linguistic units, client device 210 has determined twelve potential glossary terms: (1) sales and marketing user, (2) commercial, (3) personal finance, (4) create, (5) delete, (6) superuser rights, (7) admin rights, (8) keypad, (9) patient monitoring system, (10) super premium information, (11) categorize, and (12) customer. Client device 210 may further process these potential glossary terms to identify a set of glossary terms, as described in more detail in connection with FIGS. 6 and 7A-7C.

As indicated above, FIGS. 5A-5H are provided merely as an example. Other examples are possible and may differ from what was described with regard to FIGS. 5A-5H.

Figure 6:
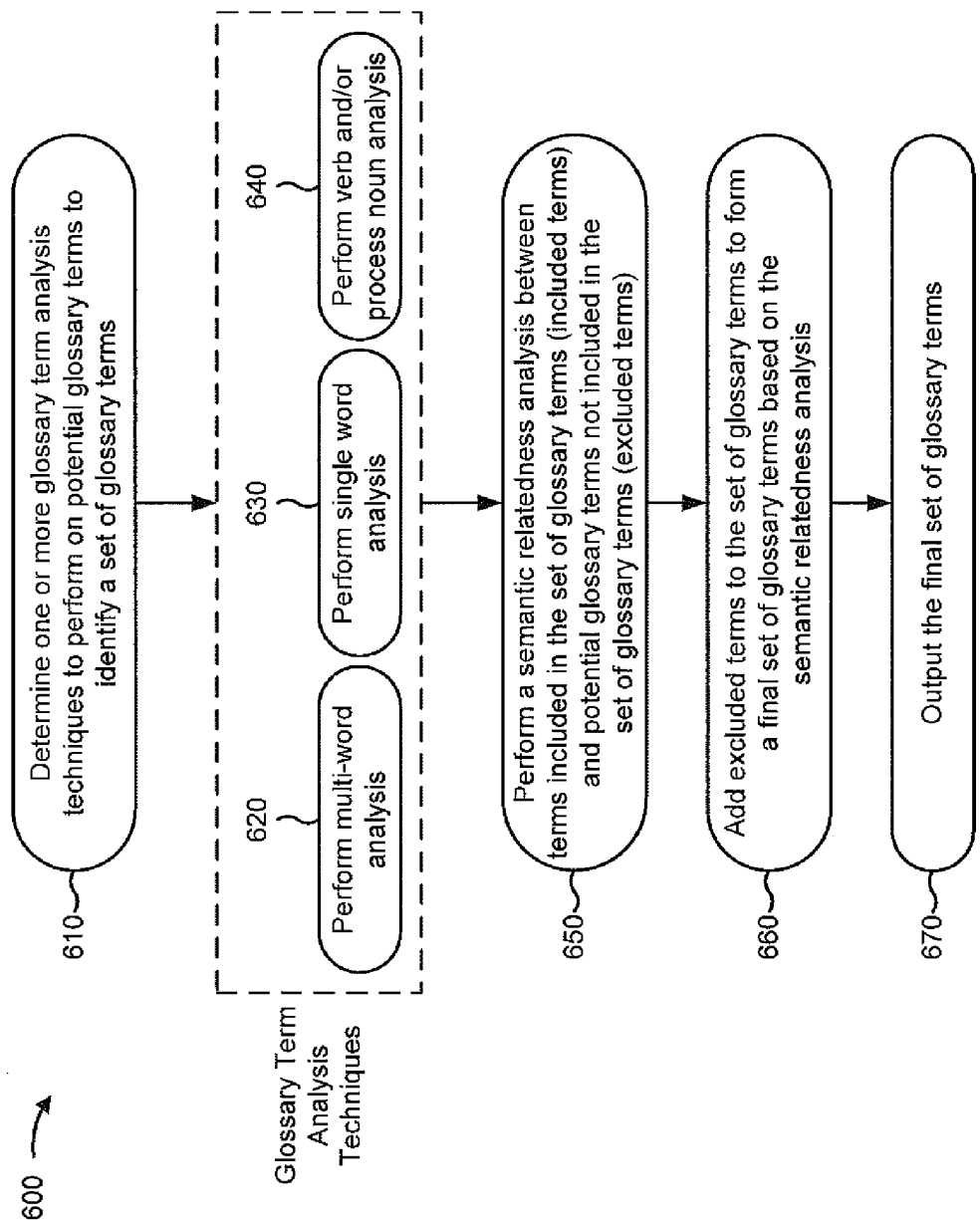
FIG. 6 is a flow chart of an example process for determining and providing a final set of glossary terms by analyzing potential glossary terms.

FIG. 6 is a flow chart of an example process 600 for determining and providing a final set of glossary terms by analyzing potential glossary terms. In some implementations, one or more process blocks of FIG. 6 may be performed by client device 210. In some implementations, one or more process blocks of FIG. 6 may be performed by another device or a group of devices separate from or including client device 210, such as server device 220.

As shown in FIG. 6, process 600 may include determining one or more glossary term analysis techniques to perform on potential glossary terms to identify a set of glossary terms (block 610). For example, client device 210 may determine the glossary term analysis technique(s) to perform, to determine a set of glossary terms, based on user input. Additionally, or alternatively, client device 210 may determine default glossary term analysis technique(s) to perform. In some implementations, client device 210 may determine the glossary term analysis technique(s) to perform based on a characteristic of the text (e.g., a size of the text, contents included in the text, a type of document that includes the text, a file format of a file that includes the text, etc.).

The glossary term analysis technique(s) may include a multi-word analysis, a single word analysis, a verb and/or process noun analysis, or the like. Except as otherwise noted below, client device 210 may perform a single glossary term analysis technique, or may perform any combination of multiple glossary term analysis techniques. When performing a combination of multiple glossary term analysis techniques, client device 210 may perform the multiple glossary term analysis techniques in any order, except as otherwise noted below.

As further shown in FIG. 6, process 600 may include performing a multi-word analysis (block 620). For example, client device 210 may perform a multi-word analysis by identifying multi-word terms (e.g., potential glossary terms that include more than one word, such as "commercial finance") that occur in the text at least a threshold number of times. Client device 210 may include these multi-word terms in the set of glossary terms. For example, client device 210 may identify multi-word potential glossary terms that occur at least twice in the text, and may add the identified terms to the set of glossary terms.

As further shown in FIG. 6, process 600 may include performing a single word analysis (block 630). For example, client device 210 may perform a single word analysis by identifying single-word nouns (e.g., potential glossary terms that include a single noun, such as "keypad") that represent physical entities. Client device 210 may include these single-word nouns in the set of glossary terms. For example, client device 210 may identify single-word potential glossary terms that are nouns, and that represent physical entities, and may add the identified terms to the set of glossary terms.

Client device 210 may determine whether a noun represents a physical entity by querying a data structure (e.g., a word list, a dictionary, WordNet, etc.) to determine whether the noun is identified in the data structure as a physical entity. Additionally, or alternatively, client device 210 may query the data structure to determine whether one or more attributes, associated with the noun, indicate that the noun is a physical entity.

As further shown in FIG. 6, process 600 may include performing a verb and/or process noun analysis (block 640). For example, client device 210 may perform a verb and/or process noun analysis by identifying single-word verbs or process nouns that have a polysemy count of one (e.g., only have one sense or meaning). Client device 210 may determine a polysemy count of a word by querying a data structure (e.g., a word list, a dictionary, WordNet, etc.). Client device 210 may include these single-word verbs and process nouns, that have a polysemy count of one, included in the set of glossary terms. For example, client device 210 may identify single-word potential glossary terms that are verbs, and that have a polysemy count of one, and may add the identified terms to the set of glossary terms. As another example, client device 210 may identify single-word potential glossary terms that are process nouns, and that have a polysemy count of one, and may add the identified terms to the set of glossary terms. A process noun may refer to a noun that describes a process, such as "submission" (the process of submitting), "disenrollment" (the process of disenrolling), or the like.

Additionally, or alternatively, client device 210 may perform a verb and/or process noun analysis by identifying single-word verbs or process nouns that have a polysemy count that satisfies a threshold (e.g., greater than a threshold, greater than or equal to a threshold, less than a threshold, less than or equal to a threshold, equal to a threshold, etc.). For example, client device 210 may add, to the set of glossary terms, single-word verbs and process nouns that have a polysemy count greater than one.

The techniques described above with respect to each glossary term analysis technique may be applied to other glossary term analysis techniques, in some implementations. For example, client device 210 may use a polysemy count of a multi-word term or a single word noun to determine whether a potential glossary term is to be included in the set of glossary terms. As another example, client device 210 may use a threshold number of occurrences to determine whether a single-word term, a verb, a process noun, etc., is to be included in the set of glossary terms. In some implementations, client device 210 may include acronyms (e.g., identified during pre-processing, as described elsewhere herein) in the set of glossary terms (and/or the final set of glossary terms).

Based on performing one or more of the above glossary term analysis techniques, client device 210 may identify a first set of potential glossary terms that are included in the set of glossary terms, and may identify a second set of potential glossary terms that are excluded from the set of glossary terms. A potential glossary term that is included in the set of glossary terms may be referred to herein as an included term. A potential glossary term that is excluded from (e.g., not included in) the set of glossary terms may be referred to herein as an excluded term. In some implementations, client device 210 may analyze an excluded term to determine whether the excluded term should be included in the set of glossary terms (e.g., to become an included term).

As further shown in FIG. 6, process 600 may include performing a semantic relatedness analysis between terms included in the set of glossary terms (included terms) and potential glossary terms not included in the set of glossary terms (excluded terms) (block 650), and may add excluded terms to the set of glossary terms to form a final set of glossary terms based on the semantic relatedness analysis (block 660). For example, client device 210 may perform a semantic relatedness analysis by determining a semantic score (e.g., a numerical value) for an excluded term based on a degree of relatedness of the excluded term to one or more included terms. In some implementations, client device 210 may compare the semantic score to a threshold value, and may add the excluded term to the set of glossary terms when the semantic score satisfies the threshold value. In some implementations, the threshold value may be based on (e.g., may be a multiple of) a polysemy count of the excluded term. Client device 210 may apply the semantic relatedness analysis to single-word terms, multi-word terms, or both single-word and multi-word terms. For example, the semantic relatedness between two multi-word terms can be computed as the average of the relatedness between every pair of single words in the multi-word terms.

As an example, client device 210 may perform a semantic relatedness analysis by calculating a semantic relatedness score for each sense (e.g., each meaning) of a single-word excluded term, and determining the maximum semantic relatedness score across all senses of the single-word term. For example, client device 210 may calculate the semantic relatedness score as follows:

$$Sem_{relatedness}(E_n, I_m) = argMaX_{\forall senses}(SemanticScore_{sense}(E_n, I_m))$$

$E_n \in$ single word terms in the set of n excluded terms
$I_m \in$ single word terms in the set of m glossary terms In the above expression, $Sem_{relatedness}(E_n, I_m)$ may represent a maximum sense score determined as a result of comparing individual semantic relatedness scores calculated between each sense of an excluded term $E_n$ and an included term $I_m$. For example, client device 210 may calculate a first semantic relatedness score to determine a degree of relatedness between a first sense of an excluded term $E_n$ and an included term $I_m$. Client device 210 may also calculate a second semantic relatedness score to determine a degree of relatedness between a second sense of the excluded term $E_n$ and the included term $I_m$. Client device 210 may compare the first semantic relatedness score to the second relatedness score to determine which score has a greater value. The score with the greater value (or either score in the case of a tie) may be represented by $Sem_{relatedness}(E_n, I_m)$, the maximum sense score between the excluded term En and the included term $I_n$. Client device 210 may utilize one or more of a variety of techniques to determine the semantic relatedness score $SemanticScore_{sense}$, such as an Adapted Lesk score, a WordNet-based semantic similarity measurement, etc.

Client device 210 may determine multiple maximum sense scores for the excluded term $E_n$ by determining a semantic similarity score for each sense of $E_n$ when compared to each term $I_m$ included in the set of glossary terms. Client device 210 may determine the maximum of the multiple maximum sense scores as an overall semantic relatedness score for the excluded term. Client device 210 may compare this overall semantic relatedness score to a threshold value and, if the overall semantic relatedness score satisfies the threshold value, may add the excluded term to the set of glossary terms (thus becoming an included term). The threshold value may be based on a polysemy count of the excluded term, and may be weighted. For example, client device 210 may add a particular excluded term $E_1$ to the set of glossary terms if:

$$argMax_{\forall m}(Sem_{relatedness}(E_1, I_m)) > kP$$

In the above expression, k may represent a weighted value for the threshold (e.g., a value of 7, or another value), and P may represent a polysemy count for the term $E_1$.

Client device 210 may repeat the above process for each excluded term, until all excluded terms have been processed and either added to the set of glossary terms or prevented from being added to the set of glossary terms. As excluded terms are added to the set of glossary terms, the size of the set of glossary terms may grow, and client device 210 may use the added terms as included terms in the above analysis (e.g., may compute a semantic relatedness score between a sense of an excluded term and an added term). Additionally, or alternatively, client device 210 may not use the added terms in further analysis of excluded terms. Once client device 210 has processed the potential glossary terms, the terms included in the set of glossary terms may form a final set of glossary terms.

As further shown in FIG. 6, process 600 may include outputting the final set of glossary terms (block 670). For example, client device 210 may output the final set of glossary terms by providing the final set of glossary terms via a user interface. A user may interact with the user interface to provide definitions for the final set of glossary terms, such as by inputting a definition into client device 210, looking up a definition using client device 210, or the like. Additionally, or alternatively, client device 210 may receive input to sort the final set of glossary terms (e.g., alphabetically, by order of appearance in the text, by quantity of occurrences, etc.). In this way, client device 210 may assist a user in identifying terms, included in a text, that should be included in a glossary of the text.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

Figure 7A:
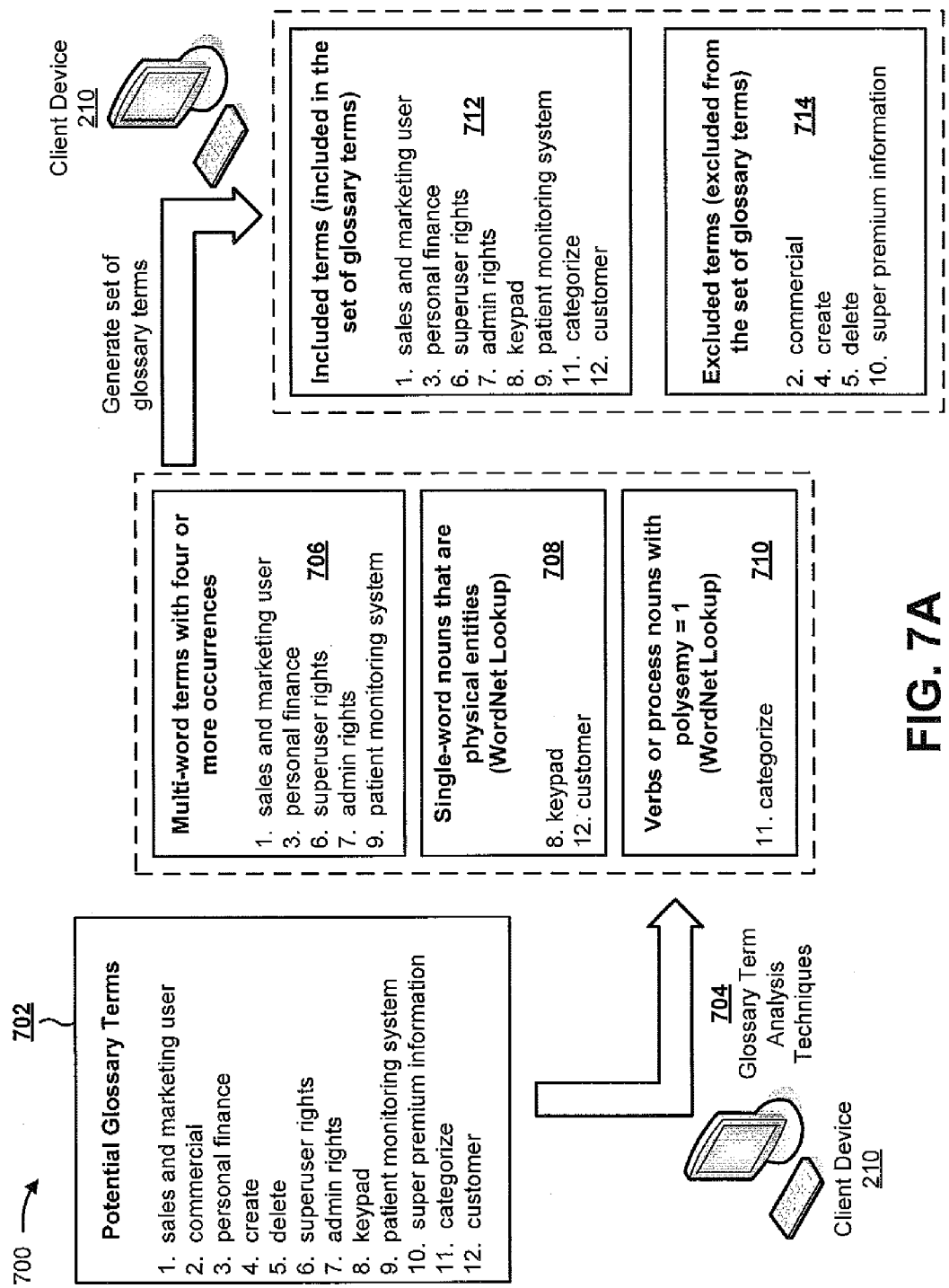
FIGS. 7A-7C are diagrams of an example implementation relating to the example process shown in FIG. 6.
Figure 7B:
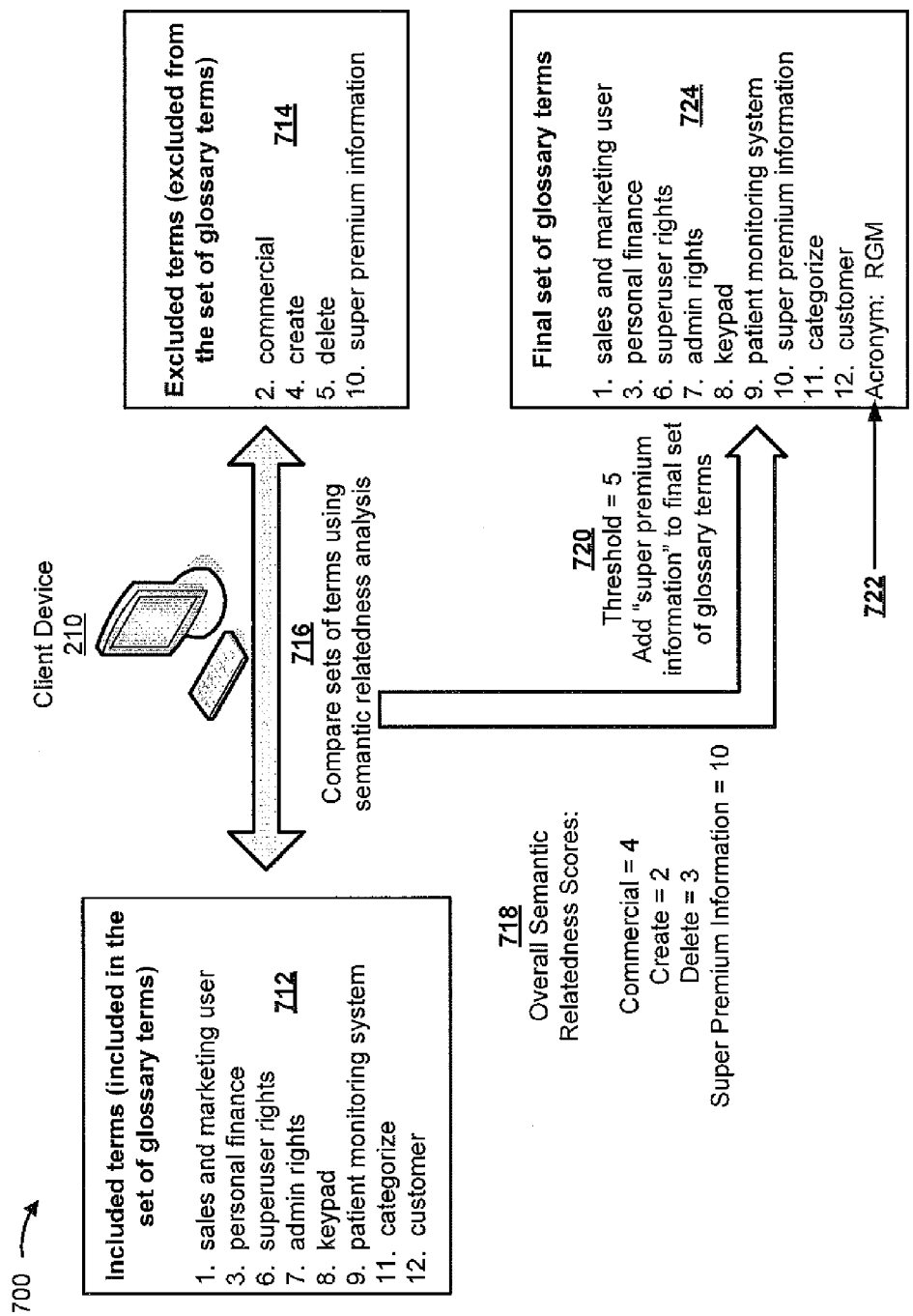
Figure 7C:
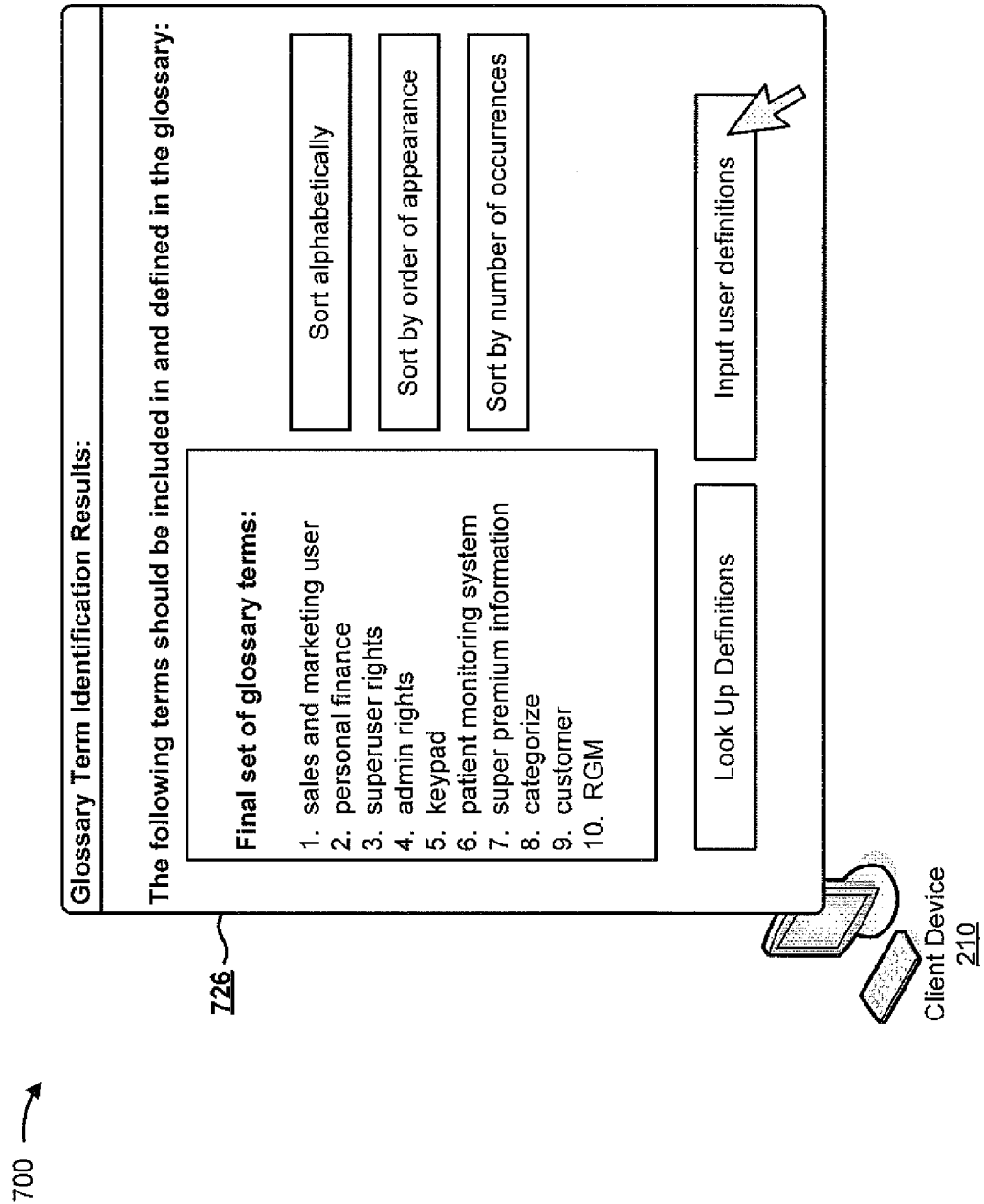

FIGS. 7A-7C are diagrams of an example implementation 700 relating to example process 600 shown in FIG. 6. FIGS. 7A-7C depict examples where client device 210 determines a set of glossary terms from potential glossary terms, expands the set of glossary terms to form a final set of glossary terms, and outputs the final set of glossary terms.

As shown in FIG. 7A, and by reference number 702, assume that client device 210 determines a list of twelve potential glossary terms as described herein in connection with FIGS. 5A-5H. As shown by reference number 704, assume that client device 210 analyzes the potential glossary terms using glossary term analysis techniques, including a multi-word analysis technique, a single-word analysis technique, and a verb and/or process noun analysis technique.

As shown by reference number 706, client device 210 determines a subset of the potential glossary terms that are multi-word terms with four or more occurrences in Document A. Based on this multi-word analysis, client device 210 determines that the following terms are to be included in the set of glossary terms: (a) sales and marketing user, (b) personal finance, (c) superuser rights, (d) admin rights, and (e) patient monitoring system. Referring back to FIG. 5H, "sales and marketing user" appears 15 times in the text, "personal finance" occurs 6 times in the text, "superuser rights" appears 4 times in the text, "admin rights" appears 9 times in the text, and "patient monitoring system" occurs 5 times in the text. These terms are added to the list of included terms, as shown by reference number 712. Referring again back to FIG. 5H, the multi-word term "super premium information" occurs 3 times in the text, and is thus excluded from the set of glossary terms, as shown by reference number 714.

As shown by reference number 708, client device 210 determines a subset of the potential glossary terms that are single-word nouns that are physical entities (e.g., by performing a query using a WordNet database). Based on this single-word analysis, client device 210 determines that the following terms are to be included in the set of glossary terms: (a) keypad, and (b) customer, since "keypad" and "customer" refer to physical entities. These terms are added to the list of included terms, as shown by reference number 712. The single-word term "commercial" does not refer to a physical entity, and is thus excluded from the set of glossary terms, as shown by reference number 714.

As shown by reference number 710, client device 210 determines a subset of the potential glossary terms that are single-word verbs or process nouns with a polysemy count of one (e.g., by performing a query using a WordNet database). Based on this verb analysis and process noun analysis, client device 210 determines that the term "categorize" is to be included in the set of glossary terms, since "categorize" has a polysemy count of one (e.g., has one sense). Thus, "categorize" is added to the list of included terms, as shown by reference number 712. The single-word verbs "create" and "delete" have a polysemy count greater than one, and are thus excluded from the set of glossary terms, as shown by reference number 714.

As shown in FIG. 7B, and by reference number 716, client device 210 compares excluded terms (reference number 714) to included terms (reference number 712) using a semantic relatedness analysis. As shown by reference number 718, assume that client device 210 computes the following overall semantic relatedness scores for the excluded terms: (a) a score of 4 for "commercial," (b) a score of 2 for "create," (c) a score of 3 for "delete," and (d) a score of 10 for "super premium information." As shown by reference number 720, assume that the threshold value is 5, and thus client device 210 adds "super premium information" to the set of glossary terms (e.g., because the score of 10 satisfies the threshold value of 5). As shown by reference number 722, client device 210 also adds the acronym "RGM" (e.g., as described herein in connection with FIG. 5C) to the set of glossary terms. As shown by reference number 724, client device 210 includes "super premium information" and "RGM" in the set of glossary terms to form a final set of glossary terms.

As shown in FIG. 7C, and by reference number 726, client device 210 may output the final set of glossary terms by providing a user interface that displays the final set of glossary terms. As further shown, client device 210 may permit the user to sort the final set of glossary terms (e.g., alphabetically, by order of appearance in the text, by quantity of occurrences, etc.). As further shown, client device 210 may permit the user to provide definitions for the final set of glossary terms, such as by inputting a definition into client device 210, looking up a definition using client device 210, or the like.

As indicated above, FIGS. 7A-7C are provided merely as an example. Other examples are possible and may differ from what was described with regard to FIGS. 7A-7C.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

It will be apparent that systems and/or methods, as described herein, may be implemented in many different forms of software, firmware, and hardware in the implementations illustrated in the figures. The actual software code or specialized control hardware used to implement these systems and/or methods is not limiting of the implementations. Thus, the operation and behavior of the systems and/or methods were described without reference to the specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Also, as used herein, the term "set" is intended to include one or more items, and may be used interchangeably with "one or more." Where only one item is intended, the term "one" or similar language is used. Further, the phrase "based on" is intended to mean "based, at least in part, on" unless explicitly stated otherwise.

What is claimed is:

1. A device, comprising:
one or more processors to:
receive, using an input component, a request to process text of a document to identify glossary terms included in the text;
determine, using the one or more processors and based on the request, a plurality of sections of the text to process; and
process a first section, of the plurality of sections, in parallel with a second section, of the plurality of sections, to identify the glossary terms included in the text, when processing the first section in parallel with the second section, the one or more processors are, for each of the first section and the second section, to:
determine a linguistic unit analysis technique based on a file format of a file that includes the text;
perform, using the linguistic unit analysis technique, a linguistic unit analysis on a linguistic unit, included in the text, to generate a plurality of ambiguous linguistic units from the linguistic unit,
the one or more processors, when performing the linguistic unit analysis on the linguistic unit to generate the plurality of ambiguous linguistic units, being to:
perform at least one of:
a coordinating conjunction analysis that generates the plurality of ambiguous linguistic units from the linguistic unit when the linguistic unit includes a coordinating conjunction,
an adjectival modifier analysis that generates the plurality of ambiguous linguistic units from the linguistic unit when the linguistic unit includes an adjective, or
a headword analysis that generates the plurality of ambiguous linguistic units from the linguistic unit when the linguistic unit includes an abstract noun;
resolve the plurality of ambiguous linguistic units to generate a set of potential glossary terms that includes a subset of the plurality of ambiguous linguistic units;
perform a glossary term analysis on the set of potential glossary terms to generate a set of glossary terms that includes a subset of the set of potential glossary terms;
identify a set of included terms, of the set of potential glossary terms, that are included in the set of glossary terms;
identify a set of excluded terms, of the set of potential glossary terms, that are excluded from the set of glossary terms;
determine a semantic relatedness score between at least one excluded term, of the set of excluded terms, and at least one included term, of the set of included terms;
selectively add the at least one excluded term to the set of glossary terms to form a final set of glossary terms based on the semantic relatedness score; and
output, using an output component, the final set of glossary terms for the document for presentation via a user interface.

2. The device of claim 1, where the one or more processors, when performing the linguistic unit analysis on the linguistic unit to generate the plurality of ambiguous linguistic units, are to:
determine that the linguistic unit includes the coordinating conjunction; and
perform the coordinating conjunction analysis that generates the plurality of ambiguous linguistic units from the linguistic unit based on determining that the linguistic unit includes the coordinating conjunction.

3. The device of claim 1, where the one or more processors, when performing the linguistic unit analysis on the linguistic unit to generate the plurality of ambiguous linguistic units, are to:
determine that the linguistic unit includes the adjective; and
perform the adjectival modifier analysis that generates the plurality of ambiguous linguistic units from the linguistic unit based on determining that the linguistic unit includes the adjective.

4. The device of claim 1, where the one or more processors, when performing the glossary term analysis on the set of potential glossary terms to generate the set of glossary terms, are further to:
perform at least one of:
a multi-word analysis that adds multi-word potential glossary terms, that occur at least a threshold quantity of times in the text, to the set of glossary terms,
a single-word analysis that adds single word nouns, that represent physical entities, to the set of glossary terms,
a verb analysis that adds verbs with a polysemy count of one to the set of glossary terms, or
a process noun analysis that adds process nouns with the polysemy count of one to the set of glossary terms.

5. The device of claim 1, where the linguistic unit includes at least one of:
a multi-word noun phrase,
a multi-word verb phrase,
a single-word noun, or
a single-word verb.

6. The device of claim 1, where the one or more processors, when performing the linguistic unit analysis on the linguistic unit to generate the plurality of ambiguous linguistic units, are to:
determine that the linguistic unit includes the abstract noun; and
perform the headword analysis that generates the plurality of ambiguous linguistic units from the linguistic unit based on determining that the linguistic unit includes the abstract noun.

7. A non-transitory computer-readable medium storing instructions, the instructions comprising:
one or more instructions that, when executed by one or more processors, cause the one or more processors to:
receive, using an input component, a request to process text to identify glossary terms included in the text;
determine, using the one or more processors and based on the request, a plurality of sections of the text to process; and
process a first section, of the plurality of sections, in parallel with a second section, of the plurality of sections, to identify the glossary terms included in the text,
the one or more instructions to process the first section in parallel with the section include:
one or more instructions that, when executed by the one or more processors, cause the one or more processors, for each of the first section and the second section, to:
determine a linguistic unit analysis technique based on a file format of a file associated with the text;
perform, using the linguistic unit analysis technique, a linguistic unit analysis on a linguistic unit, included in the text, to generate a plurality of linguistic units related to the linguistic unit,
the one or more instructions, that cause the one or more processors to perform the linguistic unit analysis on the linguistic unit to generate the plurality of linguistic units, causing the one or more processors to:

perform at least one of:
- a coordinating conjunction analysis that generates the plurality of linguistic units from the linguistic unit when the linguistic unit includes a coordinating conjunction,
- an adjectival modifier analysis that generates the plurality of linguistic units from the linguistic unit when the linguistic unit includes an adjective, or
- a headword analysis that generates the plurality of linguistic units from the linguistic unit when the linguistic unit includes an abstract noun;

analyze the plurality of linguistic units to generate a set of potential glossary terms that includes a subset of the plurality of linguistic units;

perform a glossary term analysis on the set of potential glossary terms to generate a set of glossary terms that includes a subset of the set of potential glossary terms;

identify a set of included terms, of the set of potential glossary terms, that are included in the set of glossary terms;

identify a set of excluded terms, of the set of potential glossary terms, that are excluded from the set of glossary terms;

determine a semantic relatedness score between at least one excluded term, of the set of excluded terms, and at least one included term, of the set of included terms;

selectively add the at least one excluded term to the set of glossary terms to form a final set of glossary terms based on the semantic relatedness score; and output, using an output component, the final set of glossary terms for presentation via a user interface.

8. The non-transitory computer-readable medium of claim 7, where the one or more instructions, that cause the one or more processors to perform the linguistic unit analysis on the linguistic unit to generate the plurality of linguistic units, cause the one or more processors to:
   determine that the linguistic unit includes the adjective; and
   perform the adjectival modifier analysis that generates the plurality of linguistic units from the linguistic unit based on determining that the linguistic unit includes the adjective.

9. The non-transitory computer-readable medium of claim 7, where the one or more instructions, that cause the one or more processors to perform the linguistic unit analysis on the linguistic unit to generate the plurality of linguistic units, further cause the one or more processors to:
   determine that the linguistic unit includes the abstract noun; and
   perform the headword analysis that generates the plurality of linguistic units from the linguistic unit based on determining that the linguistic unit includes the abstract noun.

10. The non-transitory computer-readable medium of claim 7, where the one or more instructions, that cause the one or more processors to perform the glossary term analysis on the set of potential glossary terms to generate the set of glossary terms, further cause the one or more processors to:

perform at least one of:
- a multi-word analysis that adds multi-word potential glossary terms, that occur at least a threshold quantity of times in the text, to the set of glossary terms,
- a single-word analysis that adds single word nouns, that represent physical entities, to the set of glossary terms,
- a verb analysis that adds verbs with a polysemy count of one to the set of glossary terms, or
- a process noun analysis that adds process nouns with the polysemy count of one to the set of glossary terms.

11. The non-transitory computer-readable medium of claim 7, where the one or more instructions, that cause the one or more processors to analyze the plurality of linguistic units to generate the set of potential glossary terms, further cause the one or more processors to:
   determine a most frequent linguistic unit, of the plurality of linguistic units, that occurs in the text a greater quantity of times than other linguistic units included in the plurality of linguistic units; and
   add the most frequent linguistic unit to the set of potential glossary terms.

12. The non-transitory computer-readable medium of claim 7, where the one or more instructions, that cause the one or more processors to analyze the plurality of linguistic units to generate the set of potential glossary terms, further cause the one or more processors to:
   determine that two or more linguistic units, of the plurality of linguistic units, occur in the text an equal quantity of times, and that no other linguistic units, included in the plurality of linguistic units, occur in the text more than the equal quantity of times; and
   apply a rule to generate the set of potential glossary terms based on determining that the two or more linguistic units occur in the text the equal quantity of times and that no other linguistic units occur in the text more than the equal quantity of times,
      the rule including adding at least one of the two or more linguistic units to the set of potential glossary terms.

13. The computer-readable medium of claim 7, where the one or more instructions, that cause the one or more processors to perform the linguistic unit analysis on the linguistic unit to generate the plurality of linguistic units, cause the one or more processors to:
   determine that the linguistic unit includes the coordinating conjunction; and
   perform the coordinating conjunction analysis that generates the plurality of linguistic units from the linguistic unit based on determining that the linguistic unit includes the coordinating conjunction.

14. A method, comprising:
   receiving, by an input component of a device, a request to process text to be analyzed to identify glossary terms included in the text;
   determining, by one or more processors of the device and based on the request, a plurality of sections of the text to process; and
   processing, by the device, a first section, of the plurality of sections, in parallel with a second section, of the plurality of sections, to identify the glossary terms included in the text,
      processing the first section in parallel with the second section, for each of the first section and the second section, including:

determining a linguistic unit analysis technique based on a file format of a file that associated with the text;

performing, by the device and using the linguistic unit analysis technique, a linguistic unit analysis on a linguistic unit, included in the text, to generate a plurality of ambiguous linguistic units from the linguistic unit, the performing the linguistic unit analysis on the linguistic unit to generate the plurality of ambiguous linguistic units comprising:

performing at least one of:

a coordinating conjunction analysis that generates the plurality of ambiguous linguistic units from the linguistic unit when the linguistic unit includes a coordinating conjunction, an adjectival modifier analysis that generates the plurality of ambiguous linguistic units from the linguistic unit when the linguistic unit includes an adjective, or a headword analysis that generates the plurality of ambiguous linguistic units from the linguistic unit when the linguistic unit includes an abstract noun;

analyzing, by the device, the plurality of ambiguous linguistic units to generate a set of potential glossary terms that includes a subset of the plurality of ambiguous linguistic units;

performing, by the device, a glossary term analysis on the set of potential glossary terms to generate a set of glossary terms that includes a subset of the set of potential glossary terms;

identifying, by the device, a set of included terms, of the set of potential glossary terms, that are included in the set of glossary terms;

identifying, by the device, a set of excluded terms, of the set of potential glossary terms, that are excluded from the set of glossary terms;

determining, by the device, a semantic relatedness score between an excluded term, of the set of excluded terms, and an included term, of the set of included terms;

selectively adding, by the device, the excluded term to the set of glossary terms to form a final set of glossary terms based on the semantic relatedness score; and outputting, by an output component of the device, the final set of glossary terms for presentation via a user interface.

15. The method of claim 14, where performing the linguistic unit analysis on the linguistic unit analysis on the linguistic unit to generate the plurality of ambiguous linguistic units further comprises:

determining that the linguistic unit includes the coordinating conjunction; and performing the coordinating conjunction analysis that generates the plurality of ambiguous linguistic units from the linguistic unit based on determining that the linguistic unit includes the coordinating conjunction.

16. The method of claim 14, where performing the linguistic unit analysis on the linguistic unit analysis on the linguistic unit to generate the plurality of ambiguous linguistic units further comprises:

determining that the linguistic unit includes the abstract noun; and performing the headword analysis that generates the plurality of ambiguous linguistic units from the linguistic unit based on determining that the linguistic unit includes the abstract noun.

17. The method of claim 14, where performing the glossary term analysis on the set of potential glossary terms to generate the set of glossary terms further comprises:

performing at least one of:

a multi-word analysis that adds multi-word potential glossary terms, that occur at least a threshold quantity of times in the text, to the set of glossary terms, a single-word analysis that adds single word nouns, that represent physical entities, to the set of glossary terms, a verb analysis that adds verbs with a polysemy count of one to the set of glossary terms, or a process noun analysis that adds process nouns with the polysemy count of one to the set of glossary terms.

18. The method of claim 14, where selectively adding the excluded term to the set of glossary terms based on the semantic relatedness score further comprises:

comparing the semantic relatedness score to a threshold value; and performing a first action or a second action based on comparing the semantic relatedness score to the threshold value, the first action including adding the excluded term to the set of glossary terms when the semantic relatedness score satisfies the threshold value, and the second action including excluding the excluded term from the set of glossary terms when the semantic relatedness score does not satisfy the threshold value.

19. The method of claim 18, where the threshold value is based on a polysemy count of the excluded term.

20. The method of claim 14, where performing the linguistic unit analysis on the linguistic unit analysis on the linguistic unit to generate the plurality of ambiguous linguistic units further comprises:

determining that the linguistic unit includes the adjective; and performing the adjectival modifier analysis that generates the plurality of ambiguous linguistic units from the linguistic unit based on determining that the linguistic unit includes the adjective.

* * * * *